United States Patent
Bruun et al.

(10) Patent No.: US 9,164,188 B2
(45) Date of Patent: Oct. 20, 2015

(54) FORMING A GEOLOGICAL MODEL

(71) Applicant: Statoil ASA, Stavanger (NO)

(72) Inventors: Bjorn Tornstein Bruun, Trondheim (NO); Erik Nyrnes, Trondheim (NO); Jo Eidsvik, Trondheim (NO)

(73) Assignee: Statoil Petroleum AS, Stavanger (NO)

( * ) Notice: Subject to any disclaimer, the term of this patent is extended or adjusted under 35 U.S.C. 154(b) by 154 days.

(21) Appl. No.: 13/861,114

(22) Filed: Apr. 11, 2013

(65) Prior Publication Data

US 2013/0231868 A1 Sep. 5, 2013

Related U.S. Application Data

(63) Continuation of application No. 12/743,338, filed as application No. PCT/EP2008/065331 on Nov. 11, 2008, now Pat. No. 8,442,770.

(30) Foreign Application Priority Data

Nov. 16, 2007 (GB) .................................. 0722469.4

(51) Int. Cl.
*G06F 19/00* (2011.01)
*G01V 1/30* (2006.01)
*G01V 1/28* (2006.01)

(52) U.S. Cl.
CPC ............... *G01V 1/305* (2013.01); *G01V 1/282* (2013.01); *G01V 2210/66* (2013.01); *G01V 2210/667* (2013.01)

(58) Field of Classification Search
CPC .................. G01V 11/00; G01V 1/30
USPC ..................... 702/18, 182–185, 188
See application file for complete search history.

(56) References Cited

U.S. PATENT DOCUMENTS

| | | | |
|---|---|---|---|
| 3,275,097 | A | 9/1966 | Pavey, Jr. |
| 3,590,919 | A | 7/1971 | Talley, Jr. |
| 4,378,848 | A | 4/1983 | Milberger |
| 4,576,479 | A | 3/1986 | Downs |
| 4,583,095 | A | 4/1986 | Peterson |
| 4,603,407 | A | 7/1986 | Cowles |

(Continued)

FOREIGN PATENT DOCUMENTS

| | | |
|---|---|---|
| DE | 4004228 | 8/1991 |
| EP | 0018053 | 4/1980 |

(Continued)

OTHER PUBLICATIONS

Application and File History for U.S. Appl. No. 12/743,338, filed Sep. 1, 2010, inventors Bruun et al.

(Continued)

*Primary Examiner* — Edward Raymond
(74) *Attorney, Agent, or Firm* — Patterson Thuente Pedersen, P.A.

(57) ABSTRACT

A method of forming a geological model of a region of the earth includes obtaining seismic data relating to the region, the seismic data including seismic traveltime uncertainty. A seismic velocity model of the region may also be provided and includes velocity uncertainty. Three dimensional positions of a plurality of points of the region can then be determined. The three dimensional positional uncertainties of at least some of the points can be calculated from the traveltime uncertainty and the velocity uncertainty. This can be combined with the positions to form a geological model.

23 Claims, 10 Drawing Sheets

(56) References Cited

U.S. PATENT DOCUMENTS

| | | | |
|---|---|---|---|
| 4,843,597 A | 6/1989 | Gjessing et al. | |
| 4,862,422 A | 8/1989 | Brac | |
| 4,909,671 A | 3/1990 | Skjong | |
| 4,942,557 A | 7/1990 | Seriff | |
| 4,970,699 A | 11/1990 | Bucker et al. | |
| 4,992,995 A | 2/1991 | Favret | |
| 5,029,023 A | 7/1991 | Bearden et al. | |
| 5,070,483 A | 12/1991 | Berni | |
| 5,109,362 A | 4/1992 | Berni | |
| 5,144,588 A | 9/1992 | Johnston et al. | |
| 5,159,406 A | 10/1992 | Adler et al. | |
| 5,317,383 A | 5/1994 | Berni | |
| 5,444,619 A | 8/1995 | Hoskins | |
| 5,477,324 A | 12/1995 | Berthelot et al. | |
| 5,570,321 A * | 10/1996 | Bernitsas | 367/38 |
| 5,671,136 A * | 9/1997 | Willhoit, Jr. | 702/18 |
| 5,724,309 A | 3/1998 | Higgs | |
| 5,892,732 A | 4/1999 | Gersztenkorn et al. | |
| 5,940,777 A | 8/1999 | Keskes | |
| 5,987,388 A | 11/1999 | Crawford et al. | |
| 6,011,557 A | 1/2000 | Keskes et al. | |
| 6,011,753 A | 1/2000 | Chien | |
| 6,026,057 A * | 2/2000 | Byun et al. | 367/52 |
| 6,028,817 A | 2/2000 | Ambs | |
| 6,049,760 A | 4/2000 | Scott | |
| 6,081,481 A | 6/2000 | Sabatier et al. | |
| 6,134,966 A | 10/2000 | Donskoy et al. | |
| 6,141,440 A | 10/2000 | Melen | |
| 6,182,015 B1 | 1/2001 | Altan et al. | |
| 6,301,193 B1 | 10/2001 | Martin et al. | |
| 6,420,976 B1 | 7/2002 | Baggs et al. | |
| 6,456,565 B1 | 9/2002 | Grall et al. | |
| 6,473,695 B1 | 10/2002 | Chutov et al. | |
| 6,536,528 B1 | 3/2003 | Amin et al. | |
| 6,672,391 B2 | 1/2004 | Anderson et al. | |
| 6,725,163 B1 | 4/2004 | Trappe et al. | |
| 6,735,526 B1 | 5/2004 | Meldahl et al. | |
| 6,752,214 B2 | 6/2004 | Amin et al. | |
| 6,772,840 B2 | 8/2004 | Headworth | |
| 6,788,618 B2 | 9/2004 | Clayton et al. | |
| 6,873,571 B2 | 3/2005 | Clayton et al. | |
| 7,011,152 B2 | 3/2006 | Soelvik | |
| 7,032,658 B2 | 4/2006 | Chitwood et al. | |
| 7,137,451 B2 | 11/2006 | Smith | |
| 7,261,162 B2 | 8/2007 | Deans et al. | |
| 7,311,151 B2 | 12/2007 | Chitwood et al. | |
| 7,383,133 B1 | 6/2008 | Scott | |
| 7,463,549 B2 | 12/2008 | Naess | |
| 7,530,398 B2 | 5/2009 | Balkanyi et al. | |
| 7,615,893 B2 | 11/2009 | Biester et al. | |
| 7,660,188 B2 | 2/2010 | Meldahl | |
| 7,703,535 B2 | 4/2010 | Benson | |
| 7,720,609 B2 | 5/2010 | Meldahl | |
| 7,721,807 B2 | 5/2010 | Stoisits et al. | |
| 7,793,724 B2 | 9/2010 | Daniel et al. | |
| 7,918,283 B2 | 4/2011 | Balkanyi et al. | |
| 7,931,090 B2 | 4/2011 | Smedstad et al. | |
| 7,933,003 B2 | 4/2011 | Meldahl et al. | |
| 7,958,938 B2 | 6/2011 | Crossley et al. | |
| 7,992,632 B2 | 8/2011 | Bornes et al. | |
| 8,033,336 B2 | 10/2011 | Benson | |
| 8,089,390 B2 | 1/2012 | Jones et al. | |
| 8,115,491 B2 | 2/2012 | Alumbaugh et al. | |
| 8,212,410 B2 | 7/2012 | Biester et al. | |
| 8,442,770 B2 | 5/2013 | Bruun et al. | |
| 8,757,270 B2 | 6/2014 | Stenevik | |
| 2002/0126575 A1 | 9/2002 | Bittleston et al. | |
| 2003/0060102 A1 | 3/2003 | Ambs | |
| 2004/0015296 A1 * | 1/2004 | Causse et al. | 702/14 |
| 2004/0022125 A1 | 2/2004 | Clayton et al. | |
| 2004/0144543 A1 | 7/2004 | Appleford et al. | |
| 2004/0228214 A1 | 11/2004 | Tulett | |
| 2004/0262008 A1 | 12/2004 | Deans et al. | |
| 2005/0178556 A1 | 8/2005 | Appleford et al. | |
| 2005/0209783 A1 | 9/2005 | Bittleston | |
| 2005/0288862 A1 | 12/2005 | Rode et al. | |
| 2006/0098529 A1 | 5/2006 | Anderson et al. | |
| 2006/0175062 A1 | 8/2006 | Benson | |
| 2006/0285437 A1 | 12/2006 | Sinha et al. | |
| 2007/0075708 A1 | 4/2007 | Reddig et al. | |
| 2008/0288173 A1 | 11/2008 | Saenger | |
| 2009/0128800 A1 | 5/2009 | Meldahl et al. | |
| 2009/0204330 A1 * | 8/2009 | Thomsen et al. | 702/14 |
| 2010/0128561 A1 | 5/2010 | Meldahl et al. | |
| 2010/0133901 A1 | 6/2010 | Zhang et al. | |
| 2010/0252260 A1 | 10/2010 | Fowler et al. | |
| 2011/0046885 A1 | 2/2011 | Bussat et al. | |
| 2011/0085420 A1 | 4/2011 | Bussat et al. | |
| 2011/0242935 A1 | 10/2011 | Amundsen et al. | |
| 2011/0247825 A1 | 10/2011 | Batho et al. | |
| 2011/0251728 A1 | 10/2011 | Batho et al. | |
| 2011/0290497 A1 | 12/2011 | Stenevik | |
| 2014/0334256 A1 | 11/2014 | Amundsen et al. | |

FOREIGN PATENT DOCUMENTS

| | | |
|---|---|---|
| EP | 1403662 | 9/2003 |
| EP | 1316672 | 6/2006 |
| EP | 1879052 | 1/2008 |
| FR | 2765344 | 12/1998 |
| GB | 2001021 | 1/1979 |
| GB | 2299108 | 9/1996 |
| GB | 2331971 | 6/1999 |
| GB | 2331971 | 11/1999 |
| GB | 2342081 | 4/2000 |
| GB | 2347744 | 9/2000 |
| GB | 2364388 | 1/2002 |
| GB | 2410635 | 8/2005 |
| GB | 2416835 | 8/2006 |
| GB | 2454745 | 5/2009 |
| GB | 2460170 | 11/2009 |
| JP | 2005275540 | 10/2005 |
| RU | 9533 | 1/1900 |
| RU | 2072534 | 1/1997 |
| RU | 2121133 | 10/1998 |
| RU | 2246122 | 2/2005 |
| RU | 2271554 | 3/2006 |
| SU | 1728825 | 4/1992 |
| WO | WO 91/13373 | 9/1991 |
| WO | WO 96/18116 | 6/1996 |
| WO | WO 97/33184 | 9/1997 |
| WO | WO 00/16125 | 3/2000 |
| WO | WO 01/61380 | 8/2001 |
| WO | WO 01/90782 | 11/2001 |
| WO | WO 02/27355 | 4/2002 |
| WO | WO02/072999 | 9/2002 |
| WO | WO 02/073241 | 9/2002 |
| WO | WO 2004/003589 | 1/2004 |
| WO | WO2004003339 | 1/2004 |
| WO | WO 2004/044617 | 5/2004 |
| WO | WO 2005/078479 | 8/2005 |
| WO | WO 2006/011826 | 2/2006 |
| WO | WO 2007/141725 | 12/2007 |
| WO | WO2009042319 | 4/2009 |
| WO | WO2009151930 | 12/2009 |

OTHER PUBLICATIONS

Application and File History for U.S. Appl. No. 14/313,561, filed Jun. 24, 2014, inventors Amundsen et al.

Goldstein, Classical Mechanics, 2nd Edition. Addison-Wesley. 1981. p. 164.

Knopff et al., "Seismic Reciprocity" Geophysics. vol. 24., No. 4. Oct. 1959. pp. 681-691.

Artman, Brad, "Imaging passive seismic data," *Geophysics*, vol. 71, No. 4, pp. SI177-SI187, SP-002479903 (Jul.-Aug. 2006).

Berri, "Remote sensing of seismic vibrations by laser Doppler interferometry" Geophysics. vol. 59, No. 12. pp. 1856-1867. Dec. 1994.

Castagna, John P., et al., "Instantaneous spectral analysis: Detection of frequency shadows associated with hydrocarbons," *The Leading Edge*, XP-002461160, pp. 120-127 (Feb. 2003).

(56) References Cited

OTHER PUBLICATIONS

Daneshvar, M. Reza, et al., "Passive seismic imaging using micro-earthquakes," *Geophysics*, vol. 60, No. 4, pp. 1178-1186 (Jul.-Aug. 1995).

Hohl, Detlef, et al., "Passive Seismic Reflectivity Imaging with Ocean-Batton Cable Data," *SEG/New Orleans 2006 Annual Meeting*, XP-002-156524343, pp. 1560 (2006).

Meldahl et al., Identifying Faults and Gas Chimneyts Using Multiattributes and Neural Networks, May 2001. The Leading Edge, pp. 474-482.

Wood et al., "Decreased Stability of Methane Hydrates in Marine Sediments Owing to Phase-Boundry Roughness" Dec. 12, 2002. Nature, vol. 420. pp. 656-660.

International Search Report—PCT/GB2005/000075 dated Mar. 2, 2006 and GB 0500484.1 dated Apr. 12, 2006.

International Search Report—PCT/GB2007/004348 dated Feb. 27, 2009 and Search Report GB 0622697.1 dated Feb. 16, 2007.

International Search Report—PCT/GB2008/004243 dated May 7, 2009.

International Search Report—PCT/GB2006/003000 dated Dec. 29, 2006 and Search Report for GB 0516720.0 dated Nov. 8, 2006.

International Search Report—PCT/GB99/03039 dated Jan. 12, 2000.

Preliminary Examination Report—PCT/GB99/03039 dated Oct. 10, 2000.

International Search Report—PCT/GB2008/051223 dated Apr. 29, 2010.

Application and File History of U.S. Pat. No. 6,735,526 issued May 11, 2004, Inventors Meldahl et al.

Application and File History of U.S. Pat. No. 7,463,549 issued Dec. 9, 2008, Inventors Naess.

Application and File History of U.S. Pat. No. 7,660,188 issued Feb. 9, 2010 Inventors Meldahl et al.

Application and File History of U.S. Pat. No. 7,720,609 issued May 18, 2010, Inventors Meldahl.

Application and File History of U.S. Publication No. 2009/0128800. Published May 21, 2009. Inventors Meldahl et al.

Application and File History of U.S. Appl. No. 61/321,670, filed Apr. 7, 2010. Inventors Amundsen.

Application and File History of U.S. Appl. No. 12/789,570, filed May 28, 2010. Inventors Stenevik.

Application and File History of U.S. Appl. No. 12/809,335, filed Jun. 18, 2010. Inventors Bussat.

Application and File History of U.S. Appl. No. 12/809,467, filed Jun. 18, 2010. Inventors Bussat.

Application and File History of U.S. Publication No. 2010/0128561 published May 27, 2010 Inventors Meldahl.

Written Opinion and International Search Report from International Application No. PCT/EP2010/057403 dated Jul. 13, 2011.

Invitation to pay Additional Fees and Partial ISR from International Application No. PCT/EP2011/055140 dated May 30, 2012.

GB Search Report from GB Application No. 1005574.7 dated Jul. 21, 2010.

Bensen et al., Processing Seismic Ambient Noise Data to Obtain reliable Broad-band surface wave dispersion measurements, Jul. 28, 2006 2007. 1239-1260.

Russian Office Action for Russian Application No. 2009122380/28030897 dated Jul. 11, 2011.

Application and File History for U.S. Appl. No. 13/078,628, filed Apr. 1, 2011, inventor Amundsen.

* cited by examiner

FORMING A GEOLOGICAL MODEL

RELATED APPLICATIONS

This application is a continuation of application Ser. No. 12/743,338 filed Sep. 1, 2010, which in turn is a 371 of Application No. PCT/EP08/65331 filed Nov. 1, 2008, which claims priority to United Kingdom Application No. 0722469.4 filed Nov. 16, 2007, each of which is hereby fully incorporated herein by reference.

TECHNICAL FIELD OF THE INVENTION

The present invention relates to a method of forming a geological model.

BACKGROUND OF THE INVENTION

Seismic traveltime data and well marker data are integrated in many petroleum reservoirs for improved knowledge of oil-in-place, hydrocarbon heterogeneities, risk evaluation, and in general for making better decisions about both drilling and drainage strategies. The way seismic and well data are integrated differs dramatically and depends heavily on the main objective of study. To obtain the best out of the data, one must take into account the uncertainty associated with each data type. Consider for instance the thickness of an oil reservoir; One data source (wells) tells you it is 30 m, the second (seismic) says 50 m. How much is this reservoir worth in terms of net present value? Should we start producing hydrocarbons? If the critical thickness based on the cost and expected revenues is 40 m, we would have to trust the first source less than the second to start production.

Seismic data are acquired by emitting sound from a source such as an air gun and then monitoring the reflected signal at a set of receivers. There is a huge literature on converting such reflection data to a structural model for the subsurface, represented in (east, north and depth) coordinates. The most common method is to process manually picked reflection times (traveltimes) from main geological interfaces by collecting them to fixed surface reference positions, and then stretching the traveltimes (measured in seconds) according to a priori known velocity. One caveat with this method is its lack of ability to capture the three dimensional uncertainty in the structural model. Another is the implicit assumption that each surface reference point represents a reflection point directly underneath, and not from another reflector to the east or north of the surface location. The second assumption (referred to as 'vertical stretch' since only the depth dimension is influenced in the structural imaging) can be bypassed with more complicated depth conversion methods, for instance by using ray tracing, but the problem of capturing the three dimensional structural uncertainty remains.

Well marker data consists of geographical (east, north, depth) picks as the well goes through a geological marker. These markers typically include the interfaces detected on seismic data. Traditionally, well data have been treated as fixed, known measurements, or at least relatively so compared to the noisy seismic data. However, with the aid of modern computers, seismic processing is more reliable and the signal to noise ratio is improved. At the same time, well technology has caused a major increase in the number of deviated and deep (5 km depth) wells. The measured positions of wells are then less reliable. This means that the well marker data cannot be treated as fixed, known geographical positions, simply used to scale the seismic data from time to depth domain. Nowadays, the uncertainties of well marker positions logged while drilling and vary according to the equipment used. This has improved the risk analysis during drilling operations. The main limitation of current technology is including the well marker position and position accuracy into the broader picture of three dimensional positioning. This entails integrating the geographical reference interfaces in east, north, depth coordinates from well markers with the seismic reflection data. Wells are sparse (10-50 wells per oil field) and carry little information about the lateral continuity of a reservoir. Seismic data, on the other hand, are abundant and laterally informative, but are not directly comparable at the well marker east, north, depth scale.

Optimal methods for integrating diverse data at a common scale are known. This is text book statistics, in broad terms referred to as least squares estimation. Tools for representing seismic data in east, north and depth coordinates and integrating these data with geographical well marker data have been lacking, particularly at the level where one can deduce the three dimensional positioning uncertainty. The traditional way of updating is in the vertical direction. For almost flat horizons, this gives a reliable method but, for dipping layers, curved surfaces or faults, this can introduce bias. Methods for orthogonal shifting of dipping surfaces have been proposed, but this is still an ad-hoc technique that does not capture intrinsic direction variability that can actually be physically modelled using, for instance, ray-tracing. Moreover, consistent assessment of uncertainties is important to make fast decisions in high dimensional reservoir systems. The current state of the art is driven by a search for the 'best' structural model, without controlling the data going into the estimation. Hence, updating the geographical model is by current standards a tedious process with too much work being done on reiterating the data and trying to match information that cannot be unified.

EP1306694 discloses a method of combining first and second models of a common region of space, such as a region of the earth below the surface, to form a third model. Common points have different positions in the first and second models. A predetermined correlation exists between the positions of the common points in the first model and the positions of points of interest in the first model. The positions of the common points in the third model are derived from the common point positions in the first and second models. The positions in the third model of the points of interest are derived from the positions of the common points in the third model and from the predetermined correlation.

GB 2352746A discloses a method of producing impact point position probability maps for a well. A fixed target point is defined at an initial location of a surface with the aid of a grid composed of nodes and of grid cells. An uncertainty vector is assigned to each node and is determined by applying a Monte-Carlo statistical method. When the values for all nodes have been calculated, a resulting occurrence of location is found. A target point is projected onto each occurrence of location so as to determine a point of impact. The distribution for the set of input points is transferred to the surface and the density of the impact points gives the probably that any point of the surface is a point of impact. The probability density is mapped as level curves.

GB2325523A discloses a method of producing maps of the risks in positioning a well in an environment. The method uses a first interpreted horizon extracted from a seismic block migrated with at least a first value of velocity including a velocity uncertainty. A second interpreted horizon is formed by migration of the first horizon using a second value of the velocity equal to the first value plus the uncertainty. A third interpolated horizon is formed by migration of the first horizon using a third value of velocity equal to the first value minus the uncertainty. A positioning point for the well is selected on the first horizon and a vertical is plotted which passes through the point and intersects the second and third horizons at migrated points. On the second interpreted horizon, the positions are determined corresponding to the migrated points, the first portion of the interpreted horizon located between the said positions constituting the locus of the potential positions of the well for the uncertainty.

WO97/38330 discloses a 3-D geological modelling technique.

US 2004/0220789A1 discloses a method of calculating meshed realisations of a hydrocarbon reservoir.

According to a first embodiment of the invention, there is provided a method of forming a geological model of a region of the Earth, comprising the steps of:

"i." providing seismic data obtained from the region and including seismic travel time uncertainty;

"ii." providing a seismic velocity model of the region including velocity uncertainty;

"iii". performing image ray tracing on the seismic data using the velocity model to determine the three dimensional positions of a plurality of points of the region;

"iv." calculating three dimensional positional uncertainties of at least some of the points from the travel time uncertainty, the velocity uncertainty and uncertainty in ray propagation direction; and "v." combining the positions determined in the step "iii" with the uncertainties calculated in the step "iv" to form a first geological model.

At least some of the points may be disposed at at least one interface, identified from the seismic date, between sub-regions of the region of different seismic velocities.

At least some of the points may be disposed at faults identified from the seismic data.

The travel time uncertainty may be determined from the seismic wavelength used to obtain the seismic data.

The velocity uncertainty may be determined from knowledge of the geology of the region.

The step "iii" may comprise determining the position of each of the points as a function of: the position at a shallower interface where a ray incident at the point intersects the shallower interface: the seismic velocity from the position to the point obtained from the velocity model; and the travel time from the position to the point obtained from the seismic data. The step "iv" may comprise differentiating the function. The function may include a first sub-function representing Snell's law and a second sub-function representing dip at the position and the step "iv" may comprise determining the derivatives of the first and second sub-functions.

The step "v" may include assigning correlations among at least some of the points.

The method may further comprise assigning correlations among velocity values in the velocity model.

The method may comprise the further steps of:

"vi" providing non-seismically obtained three dimensional position data and three-dimensional positional uncertainty data about the region; and "vii" adjusting the first geological model by means of the data provided in the step "vi" to obtain a second geological model. The non-seismically obtained data may comprise well marker data.

The step "vii" may comprise selecting at least one common point of the region which is common to the first geological model and to the non-seismically obtained data and determining the position and the positional uncertainty of the common point in the second geological model from the positions and the positional uncertainties of the common point in the first geological model and in the non-seismically obtained data. The at least one common point may represent common or adjacent geological features. The at least one common point may represent a location on one interface in the first geological model and a location in the non-seismically obtained data where a well passes through the interface. The step "vii" may comprise moving the location of the common point in the first geological model substantially parallel to a ray path at or adjacent the location.

The at least one common point may represent a location on a fault in the first model and a location in the non-seismically obtained data where a well passes through the fault. The step "vii" may comprise moving the location of the common point in the first geological model substantially perpendicularly to the fault surface.

The method may further comprise updating the non-seismically obtained data by moving the location of the common point in the non-seismically obtained data in a direction substantially opposite the direction of movement in the first geological model.

The step "vi" may comprise providing non-seismically obtained velocity data and velocity uncertainty data about the region. The method may further comprise forming and/or updating the velocity model in accordance with the non-seismically obtained velocity and velocity uncertainty data.

The step "vii" may be performed with a constraint that interface/fault intersections are preserved in the second geological model.

The step "vii" may comprise selecting a plurality of common points and adjusting the first geological model in a single step.

The step "vii" may comprise adjusting the first geological model in a first step, in respect of the at least one common point on the interface, and then in a second step, in respect of the at least one common point on the fault.

The step "vii" may comprise adjusting the first geological model recursively layer by layer.

According to a second embodiment of the invention, there is provided a computer program arranged to program a computer to perform a method according to the first aspect of the invention.

According to a third embodiment of the invention, there is provided a computer containing or programmed by a program according to the second aspect of the invention.

According to a fourth embodiment of the invention, there is provided a computer-readable storage medium containing a program according to the second aspect of the invention.

According to a fifth embodiment of the invention, there is provided transmission of a program according to the second aspect of the invention.

According to a sixth embodiment of the invention, there is provided a method of drilling a bore in a region of the earth, comprising performing a method according to the first aspect of the invention and controlling drilling in accordance with the geological model.

It is thus possible to provide a technique which provides improved knowledge of the geology of a region of the earth. This may be used, for example, to allow better decisions about drilling and drainage strategies to be made.

BRIEF DESCRIPTION OF THE DRAWINGS

The invention will be further described, by way of example, with reference to the accompanying drawings, in which.

DETAILED DESCRIPTION OF THE DRAWINGS

Figure 1:
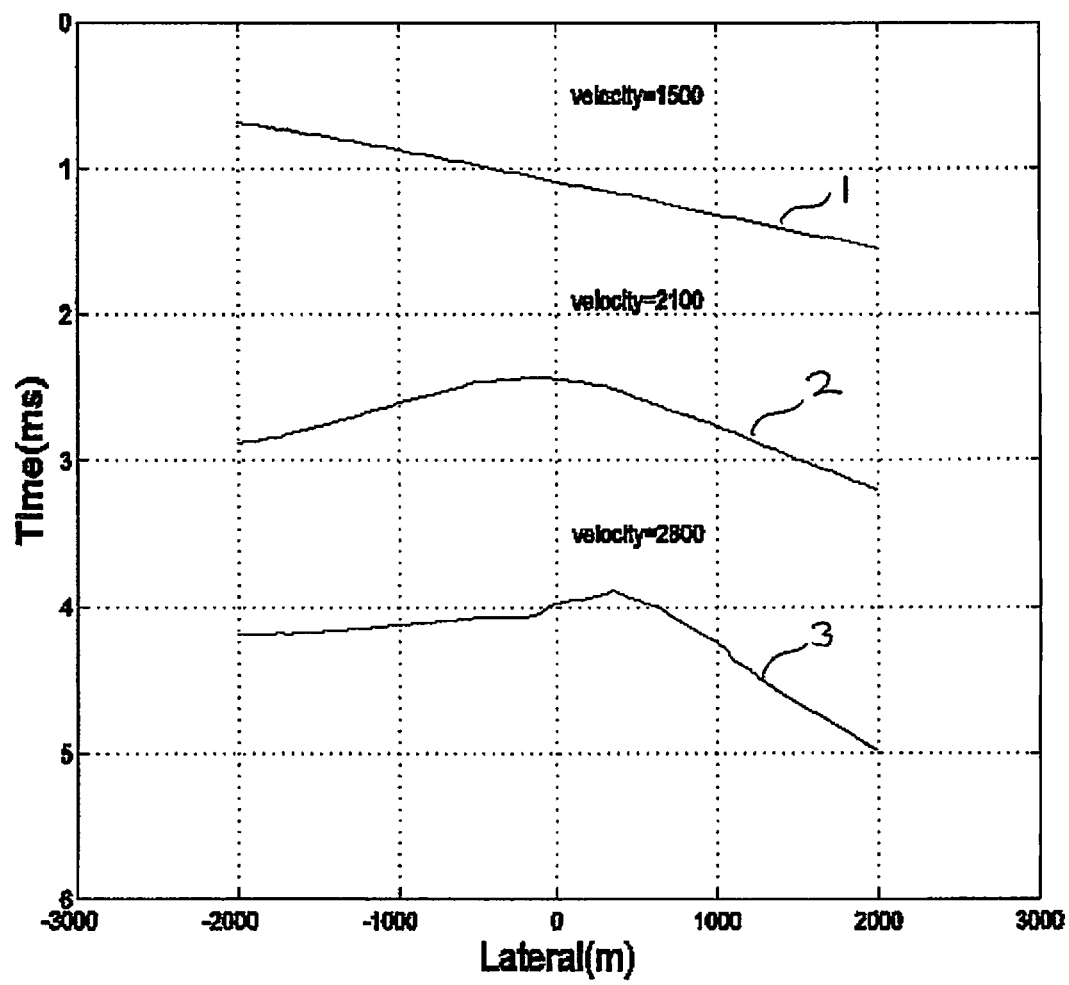
FIG. 1 is a graph of seismic travel time in milliseconds against lateral distance in meters illustrating three subsurface horizons picked from the seismic traveltime data.

In a method constituting an embodiment of the invention, the inputs required are i) Seismic traveltime data for the horizons and faults of interest. This is given as a number of point locations on a lateral north, east grid. We assume that these data are processed so that they represent the traveltime a seismic wave would use when emitted from the surface point and reflected from the horizon of interest. Such processing is a first step of any seismic interpretation scheme. The uncertainty associated with traveltime picking can be a default parameter, typically related to the wavelength of the seismic signal, say a standard deviation of 10 msec. For faults, the manual picking uncertainty is generally larger, because the signal is weaker and thus more geological interpretations involved.

ii) Velocity values for each interval in the subsurface. This is taken from a priori geological knowledge. The standard deviation of interval velocity values can also be deduced from a priori notion of uncertainty or homogeneity in the geographical zone of interest. Velocity uncertainty typically increases in deeper intervals. For instance, sea water velocity is 1500 m/sec, with standard deviation about 1 m/sec. In deep layers, velocity can be 3000 m/see, with standard deviation about 100 m/sec.

iii) Well marker data for all wells going through the main horizons interpreted from seismic traveltime data. The uncertainty of well markers is typically a built-in attribute in data acquisition schemes. For vertical wells, the east, north uncertainties are small; for deviated wells the east, north uncertainties are larger. The uncertainty also depends on the logging equipment used in the well. Common methods for positioning of wells include magnetic instrumentation, gyro devices, and gravitational indicators.

The outputs from such a method are i) Structural model for geographical positions in three dimensions: east, north and depth. This three dimensional position output is an optimal estimate based on the input data and the fixed parameters set from a priori knowledge.

ii) Structural uncertainty and correlation for all positions in three dimensions: east, north and depth. This output is the standard deviation of the three coordinates of all positions and the correlations between them. Some locations may have a larger uncertainly in the depth direction, whereas others may have a largest, uncertainty in the north-east direction. Note that the correlation between two different points is also available, indicating what, will happen to point B if point A is shifted in one direction.

iii) Velocity model constrained by seismic data and well marker information, and correlation between interval velocity and all geographical points in the structural model. This indicates what will happen to points if the interval velocity changes.

iv) A unified model in terms of constraints included in the updating. Less need for manual processing.

Based on the outputs, a number of important decisions can be made, such as optimal placement of wells, distance to target, predicting high pressure zones ahead of the well bore, computing the net present value of oil or gas within a reservoir zone while drilling, model updating in integrated operations, and velocity update for iterated processing of seismic data.

The following example illustrates the method for a relatively simple case with three horizon interfaces, three values of interval velocities and two well markers in each interface. The first step in the method is to convert the seismic time measurements to east, north and depth coordinates with associated uncertainties and correlations. This is done by image raytracing, using the idea that geographical reflection point of time migrated seismic data is located by tracing a ray straight down from the surface. As this ray hits an interface, it bends according to the relative velocity change across the two layers. The transmission angle can then be calculated from Snell's law. Within each layer, the ray is traced for the time indicated by the seismic traveltime data. Altogether, this gives one reflection point at each interface for every surface reference point.

The main steps of the conversion to depth, east, north are as follows: Start in the surface coordinates and step down in depth for the distance indicated by the velocity in the top interval and the time to the first interface 1 shown in FIG. 1. At the first interface, there are a number of reflection points. The local dip of the first horizon can be computed using local neighborhoods of points. This dip and the downgoing ray make the angle of incidence, and Snell's law says that the sine of the angle of transmission is given by the relative velocity difference between the two layers multiplied by the sine of the incidence angle. We use this law to trace a ray from the first interface 1 to the second interface 2, this time using the velocity of the second layer and the lime indicated by the seismic traveltime data for this layer.

Figure 2:
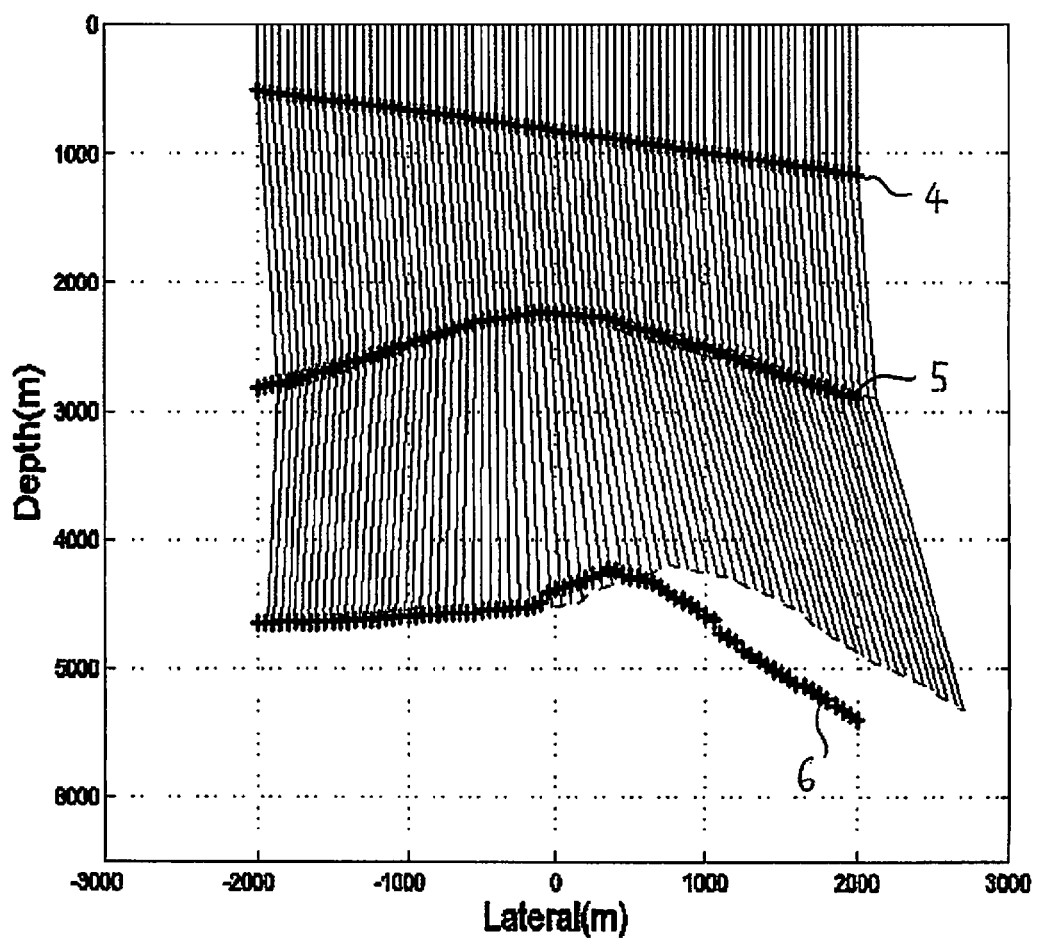
FIG. 2 is a graph of depth in meters against lateral distance in meters illustrating the result of ray tracing on the data shown in FIG. 1.

As shown in FIG. 2, the ray is now no longer vertical, unless the velocities in the two layers are equal or the dip angle of the first surface is zero. The process of applying Snell's law at an interface continues for the second layer, and takes us to geographical points in the bottommost third layer.

FIG. 1 shows picked seismic traveltime data for the three horizons. The vertical axis is in time (msec). FIG. 2 shows the rays going down from the surface and bending at interfaces. The resulting depth converted horizons 4, 5 and 6 are quite different from the horizons 1, 2 and 3 obtained from vertical stretch. This shows the bias imposed by the assumption of no bending at interfaces. Note also that the rays bend more if the local dip is larger. This is a consequence of Snell's law.

In the depth, east, north conversion described above, each depth point is computed as a function of the velocities, traveltime data and from the reflection points in the interfaces in shallower interfaces. The associated uncertainty is calculated by differentiating this functional relationship, i.e. using linearization of the nonlinear functional relations. Error propagation based on the linearized operator is used to propagate the uncertainty in the functional input variable to the output variable. By taking derivatives of all the functional relationships involved in Snell's law and the computation of dip angle, we can thus also compute the standard deviation of all points in depth, the correlation between all points, and the correlation between the interval velocity parameters and all points. In practice, this means that not only are the reflection points calculated as we trace the rays deeper and deeper, but in addition the derivatives of all calculations are carried out. The output from the seismic traveltime conversion is then i) expected reflection points in depth, east and north coordinates, and ii) uncertainty and correlations between all these reflection points and the velocities.

Figure 3:
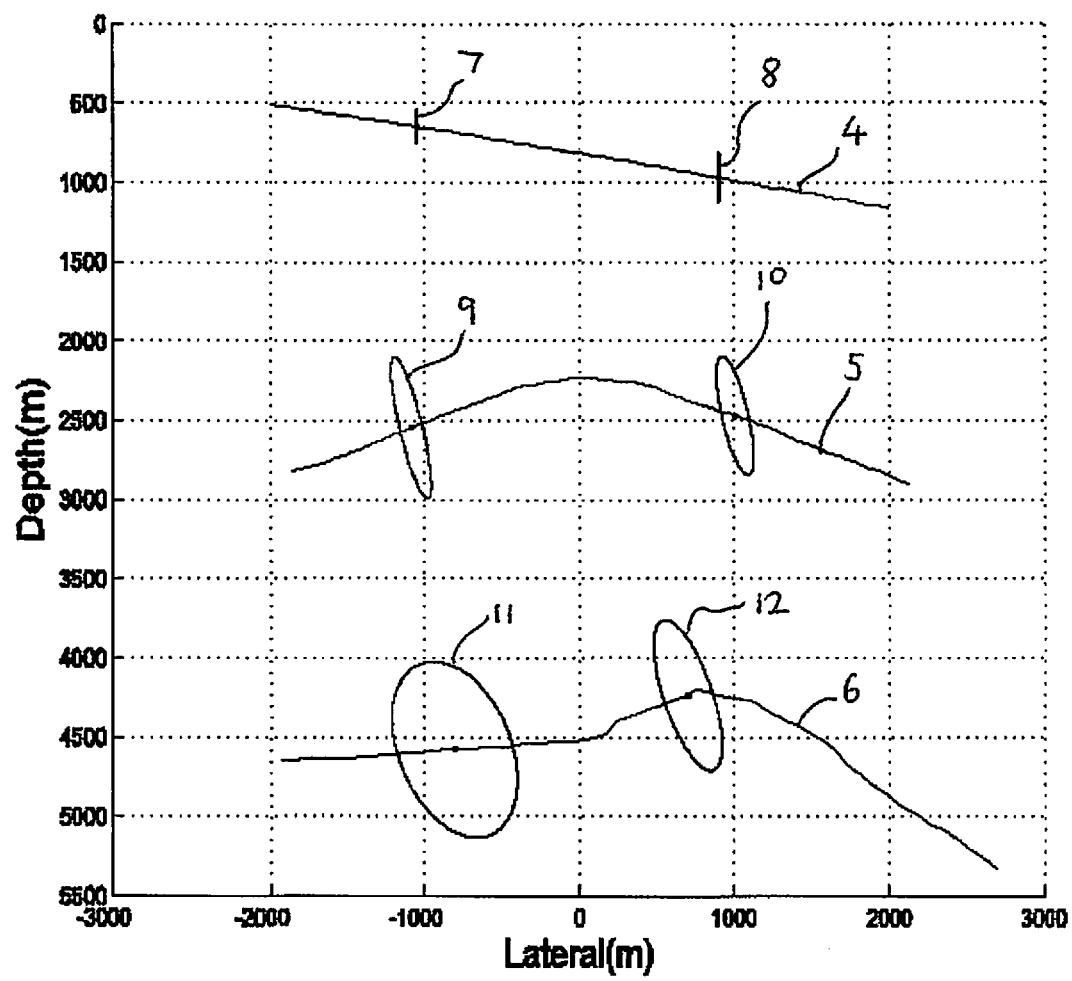
FIG. 3 is a graph of depth in meters against lateral distance in meters showing interfaces between layers obtained from the data shown in FIG. 2 and 95% uncertainty ellipsoids.

FIG. 3 shows the uncertainty of two depth, east and north locations in each layer. These uncertainty ellipsoids 7 to 12 are obtained from traveltime data, using no well information at this stage. These ellipsoids are 95 percent regions, indicating that there is a 95 percent probability that the true reflection point is within this ellipse. Note that uncertainty aggregates as we go deeper and so the ellipses become bigger for the deepest interface. As the rays pass through an area with large dip, the underlying interface gets larger horizontal (east, north) uncertainty. This is natural as the uncertainty is highly connected to the sine of the transmission angle via Snell's law.

Finally, well markers are used along with their associated uncertainty. Before updating the structural model from seismic, we now introduce the concept of 'common points': these are geographical coordinates that are common for well measurements and seismic depth, east and north coordinates. Since neither well marker data nor the points obtained from seismic data are noise free, the common points are not known. Nevertheless, we know that the well marker and the seismic geographical coordinates represent the same geological feature; thus a seismic commonpoint to a well marker can be chosen. We assign constraints to these common points. The constraints are informative about the direction in which the seismic depth, east and north coordinates should be updated. The constraints form a way of integrating the common points and all other points in the model. While the number of points can be several thousand, the number of common points is typically small (around 100 well markers).

The optimal estimate for geographical positions is calculated as a standard least squares solution, but the notion of common points and three dimensional updating gives an extra degree of flexibility. In particular, updating points along the original ray path seems intriguing. The uncertainty of all points is updated as an intrinsic part of the least squares methodology. This is smallest near common points since there are two sources of information here. It is largest far from common points and at large depths.

Figure 4:
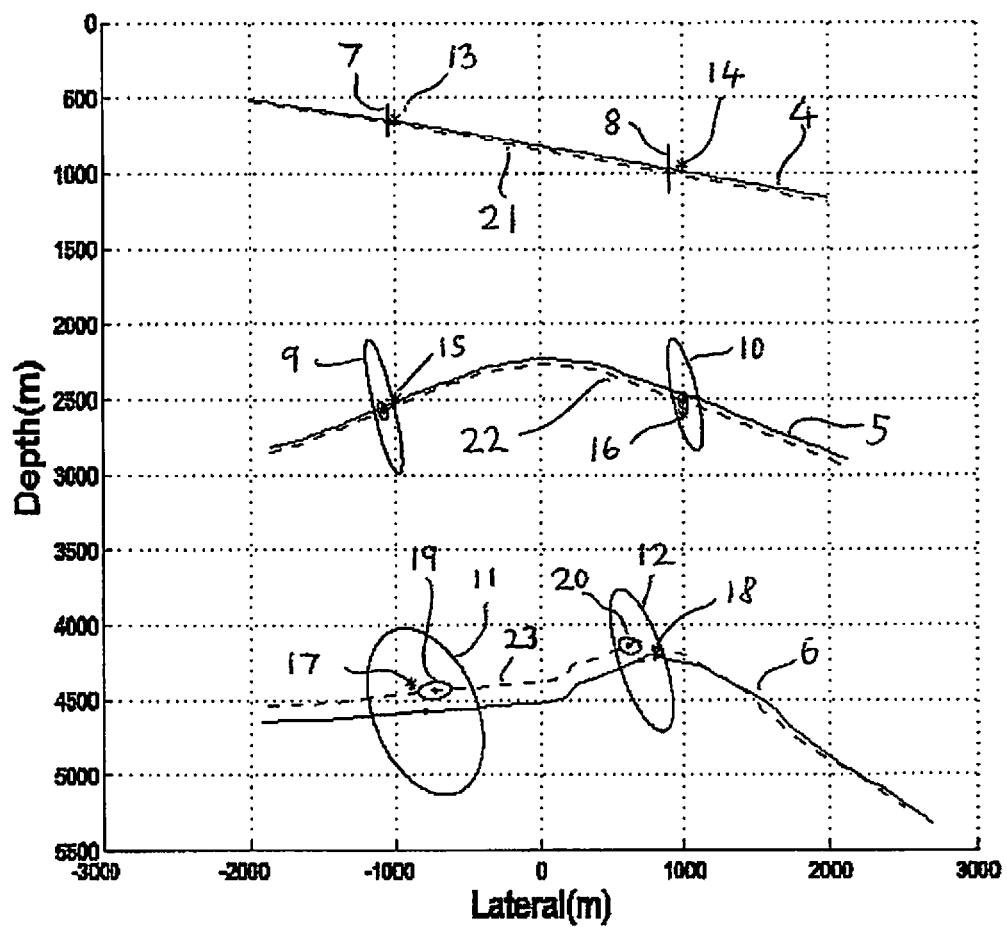
FIG. 4 is a graph similar to FIG. 3 showing the interfaces and ellipsoids of FIG. 3 and the interfaces and ellipsoids after processing by a method constituting an embodiment of the invention.

In FIG. 4 the well marker data are shown at 13 to 18. The common points are updated and the integrated estimate is marked along with the uncertainty ellipsoids, such as 19 and 20, in FIG. 4. Note that the updated uncertainty ellipsoids (19, 20) are smaller than the ones (11, 12) from seismic data alone as the uncertainty of the well picks is quite small in this case.

The broken lines in FIG. 4 represent the updated horizons 21, 22 and 23 from both seismic data and well picks. These are somewhat shifted from the estimated horizons 4, 5 and 6, respectively, using seismic data alone, but mostly locally due to a correlation window in the statistical model.

In the following, it is assumed that the image ray tracing has been executed, so that all fault and horizon data are converted into north, east and depth coordinates. The velocity model used in the image ray tracing is also present. A covariance matrix describing the uncertainty and the correlations (dependency) of all data, (velocities, spatial seismic positions and well markers), is present. For updating this model using well markers, statistical computation based on least squares mathematics are used. The various types of constraints are described below. Any combinations of the types of constraints and numbers of well markers could be used. The statistical update could be executed in three ways.

i) An update using all well markers in one go, selecting all common points (described later) from the original ray traced data set.

ii) A two step update. First adjust the model using the velocity and horizon well markers. Then calculate the fault common points in the adjusted model, and use these to update the well and horizon adjusted model using the fault well markers.

iii) A sequential update. In this form, the model is first adjusted by the well markers belonging to the uppermost horizon and the uppermost velocity layer. Thereafter the resulting model is used to calculate the common points for the well markers for velocities and horizons belonging to the next layer, and adjusted using the well markers belonging to the second layer. This process is continued until all velocities and horizons have been traversed. The model resulting from this process is used to calculate the common points of the fault well markers, and is further adjusted using the fault constraints.

No matter which of these strategies is selected, uncertainty is treated in a coherent way through the adjustment, resulting in updated uncertainties for all inputs, which are derived from all input uncertainties and correlations.

Figure 5:
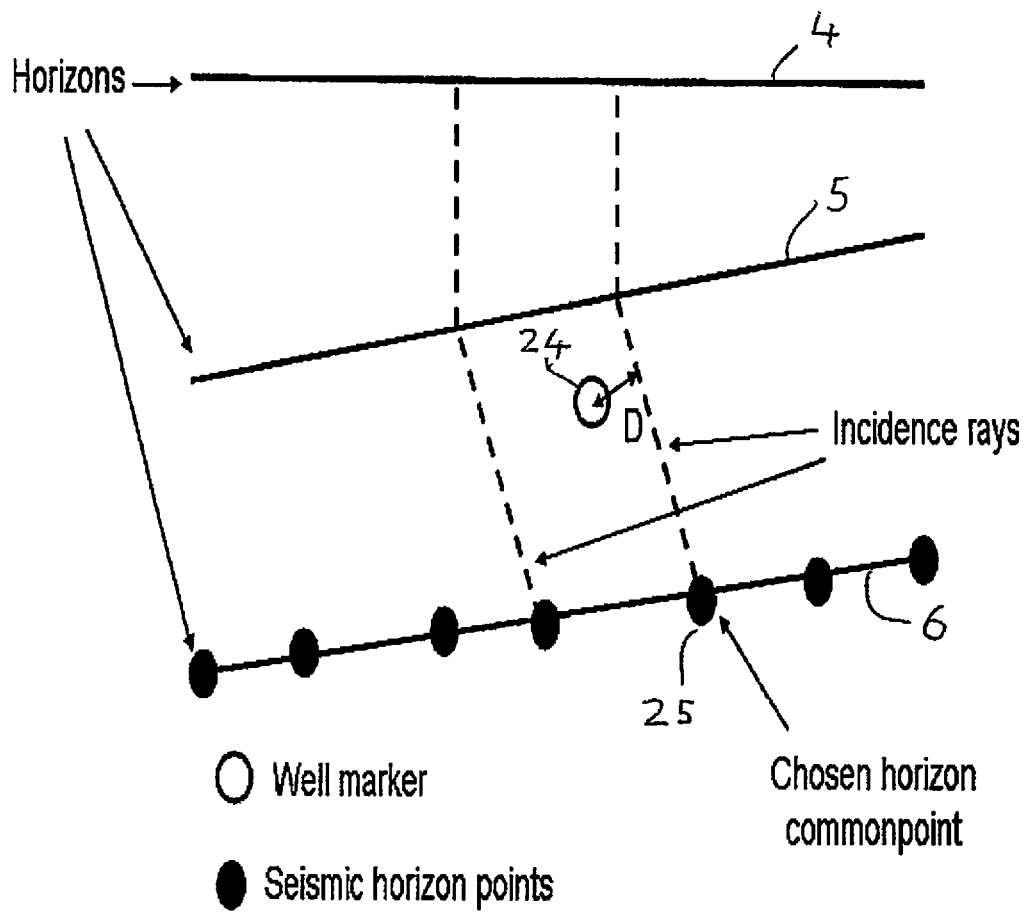
FIG. 5 illustrates diagrammatically the selection of common point pairs at a horizon.

Since a well marker of a horizon is only a single point position, we do not know exactly which seismic horizon point matches it. Assuming that the difference between the two common points is mainly due to inaccuracy in the interval velocities used in the initial ray tracing, the horizon point whose prolonged incidence ray passes closest to the well marker is chosen to be the matching seismic common point to each well marker. These two positions are thus chosen to be a common point pair as shown at 24 and 25 in FIG. 5.

Figure 6:
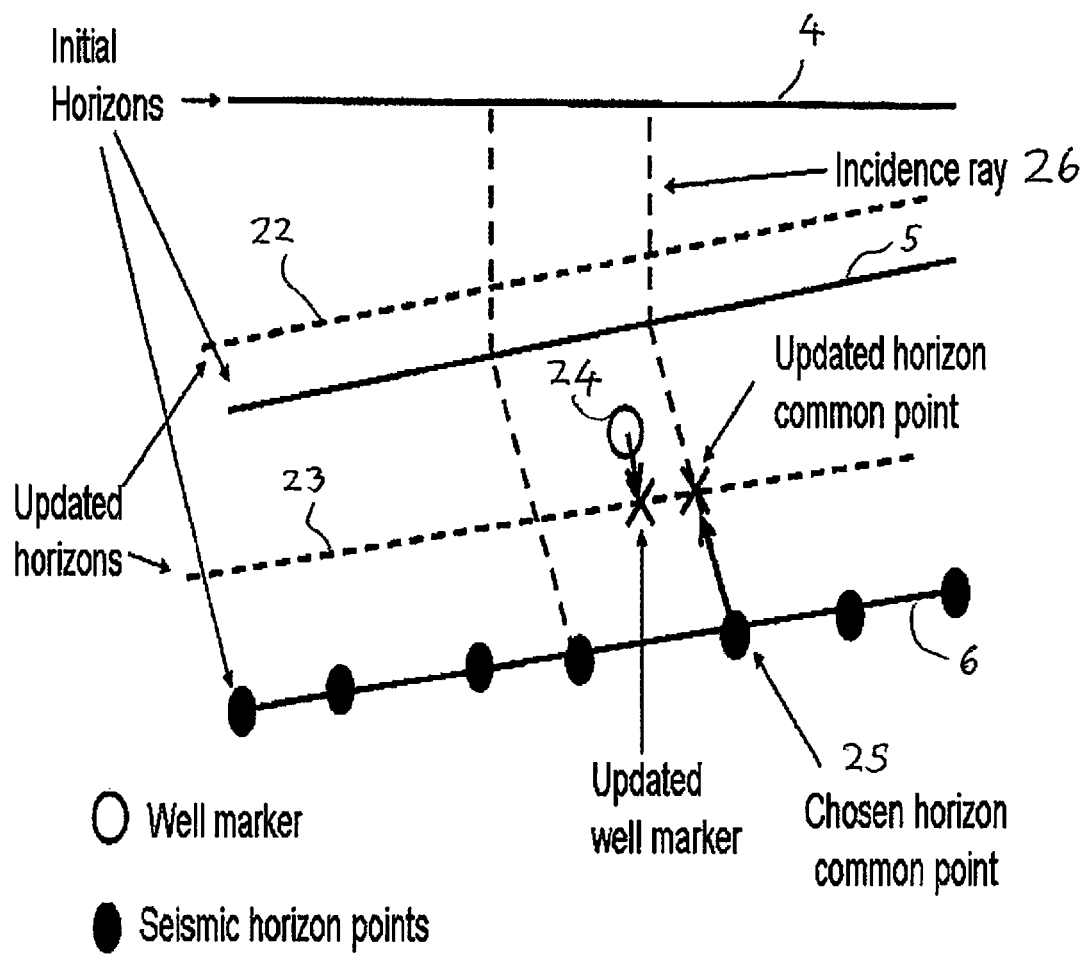
FIG. 6 illustrates diagrammatically updating a geological model using a constraint in the incident ray direction of a common point pair.

To update the seismic model using a common point pair 24, 25, a constraint between the two points is set. As stated earlier, we do not know exactly which seismic horizon point matches the well marker, only that inaccuracy of the along-incidence ray velocity is the most likely cause for the well marker and horizon not intersecting. Due to this fact, the constraint between the two identified common points is set only in the direction of the ray tracing incidence ray 26 of the selected horizon common point 25. Thus, the update from a single common point pair 24, 25 adjusts the seismic model only in the direction of the incidence ray at the seismic common point. This is shown in FIG. 6.

Figure 7:
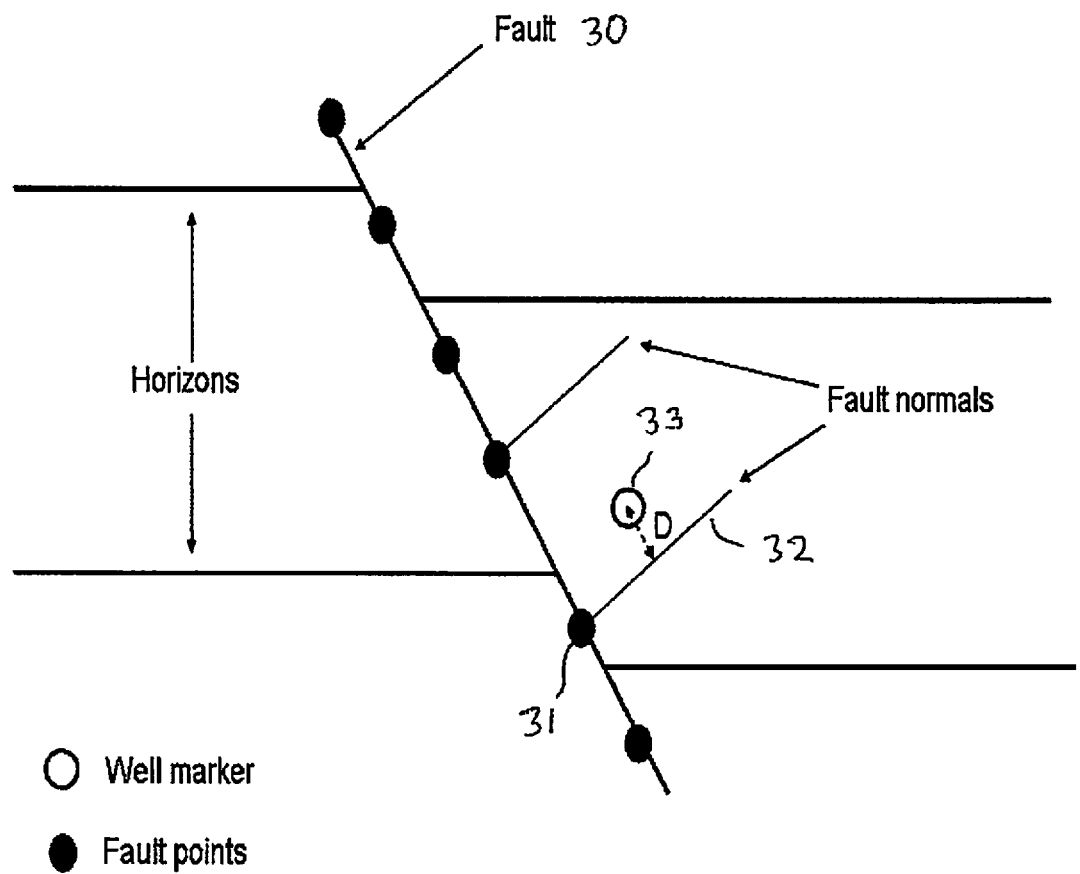
FIG. 7 illustrates diagrammatically the selection of common point pairs at a fault.

The update constraints using fault points in the common point pairs differ slightly from the constraints using horizon points. This is basically due to how a fault, such as 30 in FIG. 7, is depicted in the seismic. In the original seismic data, the exact location of a fault is not shown; only a blurred area in the seismic data shows that a fault is present somewhere within that area. The seismic interpreter then does his best to interpret the fault into that area based on intuition and prior knowledge and experience. For this reason, the fault point 31 through which the corresponding fault surface normal 32 lies closest to the corresponding well marker 33 is chosen as the seismic point in the common point pair, as shown in FIG. 7.

Figure 8:
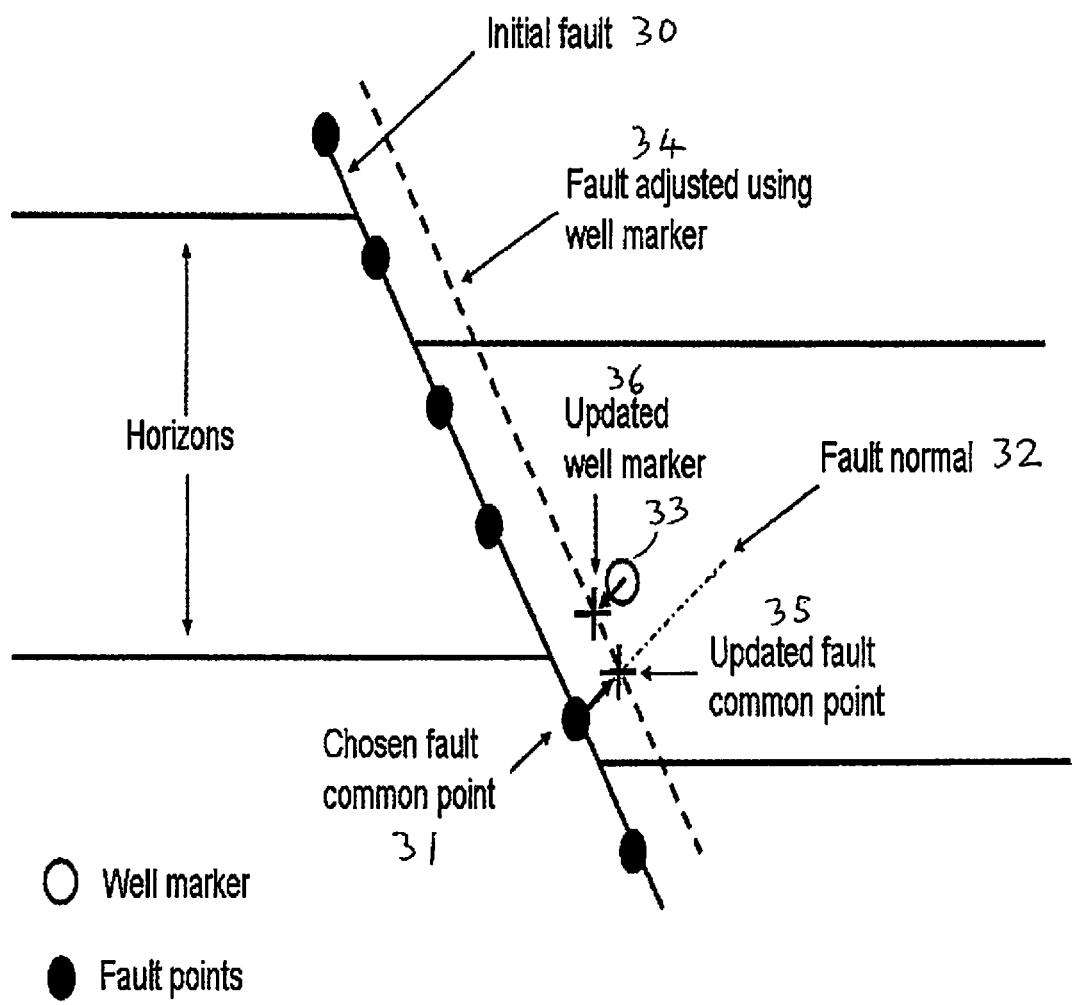
FIG. 8 illustrates diagrammatically updating a geological model using a constraint in the fault surface normal of a common point pair.

The constraint between the two common points 31, 33 is to affect only die seismic model in the direction of the fault surface normal 32 through the seismic common point 31, as shown in FIG. 8. The adjusted fault position is shown at 34 and the adjusted common point positions at 35 and 36. Other common point pairs may however adjust the model in other directions.

Figure 9A:
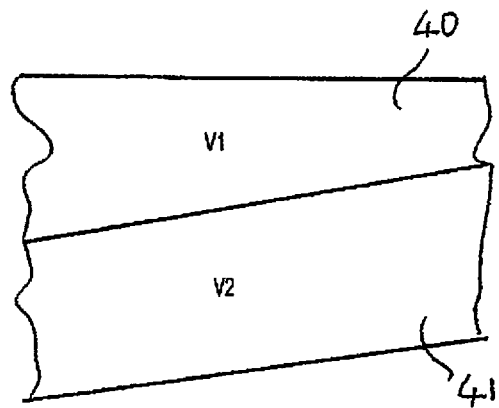
FIGS. 9a to 9c are diagrams illustrating different types of seismic velocity models.
Figure 9B:
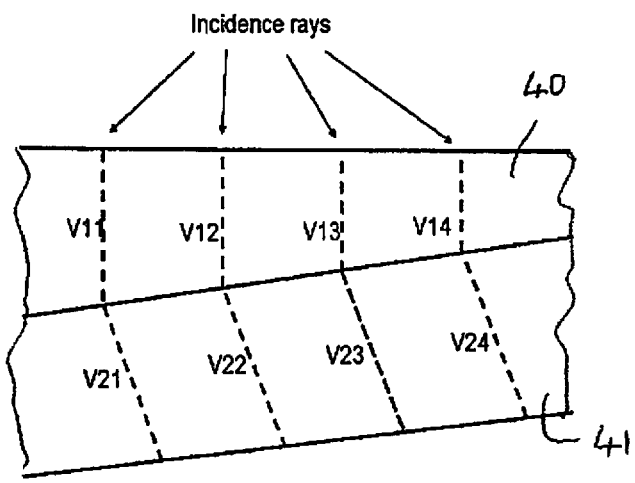

The image ray tracing uses interval velocities to convert seismic time data to 3D positional data in north, east and depth coordinates. We are thus dividing the full velocity model up in sections in which neighboring horizons are borders for each interval. Within each such interval, the bedrock velocity is modelled in various ways. For example, as shown in FIG. 9*a*, a single velocity, such as V1 and V2, may be allocated to each interval, such as 40 and 41, and it is assumed that this velocity applies to all points within the interval. Alternatively, a respective velocity Vij may be assigned to each jth trace of the ray tracing within each of ith interval as shown in FIG. 9*b*.

Figure 9C:
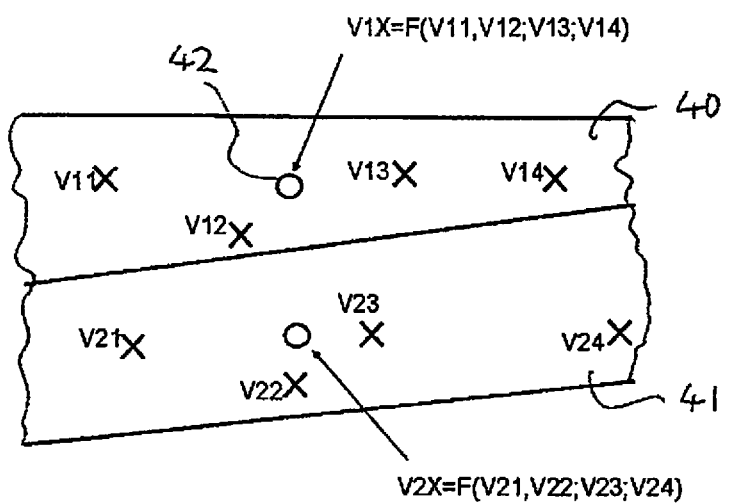

In another alternative, a set of velocities Vij may be assigned to the jth positions or points, in the ith intervals. The velocity at any arbitrary point may then be found from an interpolation function. For example, the velocity V1X at the point 42 is given by the interpolation function illustrated as F(V11,V12,V13,V14) in FIG. 9*c*. The interpolation function may, for example, form a weighted average of the velocities at a set of positions in the neighborhood of the point.

Measurements of the bedrock velocity are also available from wells drilled through the modelled area. For each such velocity measurement chosen to be a part of the adjusted model, a constraint is set up between the wellbore measurement and the corresponding velocity from the initial seismic velocity model. In the case where the interval velocity is modelled as a set of spatially fixed velocities combined with an interpolation function, the seismic velocity chosen is the velocity modelled through the interpolating function at the point chosen to match the wellbore velocity measurement.

Figure 10:
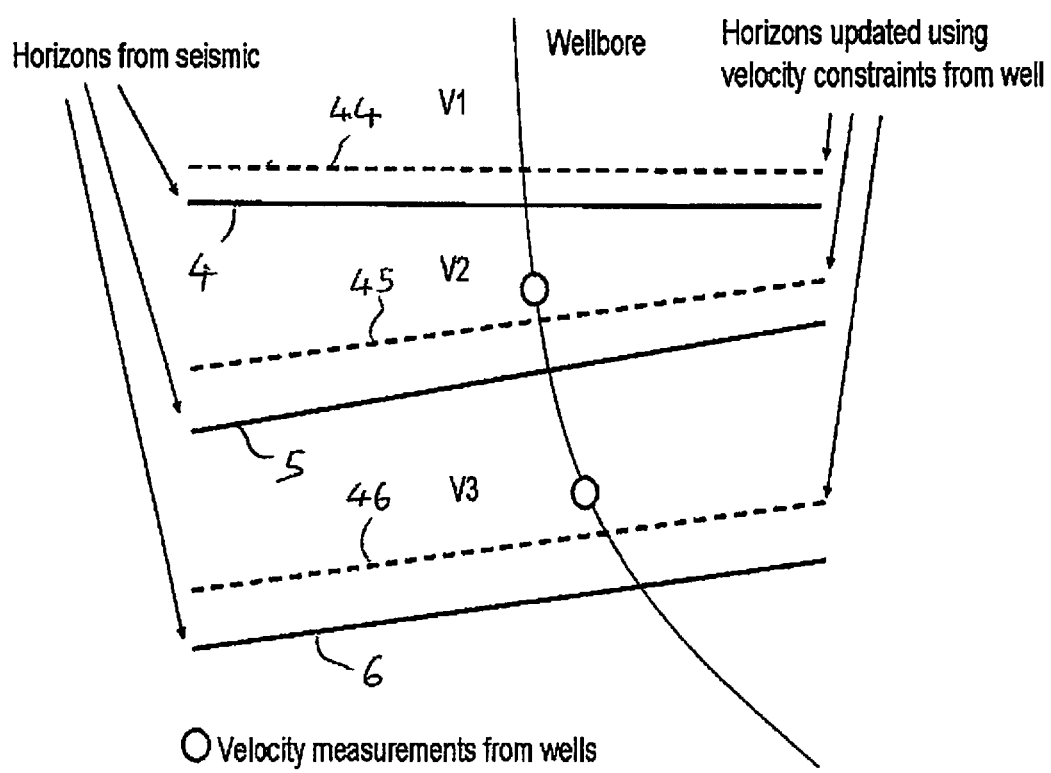
FIG. 10 is a diagram illustrating constraining of the velocity model and hence the geological model based on well bore velocity measurements.

As shown in FIG. 10, the velocities V1, V2, V3 measured during drilling through the region may be used in the ray tracing or may be used subsequently to update the seismic model by "correcting" the ray tracing. The updated horizons are shown at 44 to 46. For the example shown in FIG. 9*a*, the velocity in each interval may be made equal to a measured value, or an average of measured values, in the interval. For the examples shown in FIGS. 9*b* and 9*c*, some form of inverse interpolation function may be used to update the model values from the measured values.

To ensure that intersections between horizons and faults still intersect after the adjustment, constraints between intersecting horizon and fault points can be added, making sure that each selected horizon/fault point pair still intersect after the adjustment.

Additional Background to and Description of Embodiments of the Invention

Introduction

Reliable prediction of subsurface faults and horizons is of major importance for the petroleum industry. Both the best estimates and the uncertainty of positions are of high importance in several decision processes. One such process is well planning where this information influences the shape of well trajectories and also the shape and position of drilling targets (Haarstad et al. 2002; Prange et al., 2004). The positional uncertainty of structures is crucial information both in planning the acquisition of new subsurface data for better subsurface understanding, and in the process of planning the drainage strategy of a reservoir. Estimates of horizon and fault positions, as well as their uncertainties, is an important input for prediction of in place volume estimates.

Today most well calibration methods rely on changing the seismic velocity model until it mostly fits a set of well-measured velocities. This is a time consuming process with a lot of human interaction. The misfit between the depth converted model and well markers is then corrected using Kringing methods which adjust the depth converted horizons to fit wells only in the vertical direction. Positional uncertainty is similarly calculated only in the vertical direction (Abrahamsen 1992; Abrahamsen and Benth, 2001).

In several cases, the lateral positioning and subsequent uncertainty of structures are of importance for decisions to be made, especially in well planning. Examples of such structures are areas near and in erosion surfaces, areas close to faults, and also where horizons have changing DIP angle. Holden et al. 2003 extend the standard models for treating horizons to also include fault objects, but faults are only modelled using objects moveable in one dimension. In geo modelling, see e.g. (Caumon et al; 2004), it has been common to represent zone boundaries and update these as more data become available. One such technique, based on triangulated surfaces, was presented in Thore et al. 2002, and discussed several aspects of multidisciplinary integration and quantification of uncertainty.

A new method is presented for predicting subsurface horizon and fault positions incorporating lateral and depth position uncertainties with applications to well planning and structural model update. The approach integrates seismic traveltime data and well position markers, and converts these into predicted lateral and depth positions along with associated uncertainties and spatial correlations. Integration of diverse data leads to desirable properties: i) Main lateral structures are maintained in the depth predictions because of the large scale lateral continuity in interpreted seismic data. ii) Important corrections in depth uncertainty and smaller scale fluctuations are incorporated via well picks. Since both seismic data and well data are measured with noise, statistical integration of both data types provides prediction that captures the level of uncertainty of depth and lateral positions.

A brief description follows. Interpreted seismic traveltime data are converted into depth and lateral positions using raytracing (see e.g. Hubral, 1977). Faults and horizons are treated as point objects in three dimensions, but the uncertainty of the fault objects might be different from that of horizon objects due to interpretation issues in seismic processing. Well markers correct the initial seismic depth model using the wellbore position measurements along with a set of constraints for geological boundaries. We use a Gaussian model for positions in 3D and the corrections are made based on the modelled covariance matrices, (see e.g. Cressie, 1993).

The concept of seismic ray-tracing for time domain to depth domain conversion, the uncertainty calculation associated with this method, a proposed model for including fault points, to well updating of the subsurface model, several options for integrating the well marker data, and numerical examples of the methodology are presented below. Mathematical details are then presented.

Seismic Image Ray Migration

The simplest approach for converting seismic traveltime picks into depth and lateral positions is vertical stretch depth conversion. An assumption is made that time migration has positioned all reflectors at their correct lateral position and the traveltime picks are simply structural in the vertical direction using interval velocities. A more realistic approach, which is considered here, is to depth convert seismic traveltime picks using image ray tracing (map migration). A ray is then traced downwards for the time indicated by the time migrated data at that particular lateral location. This image ray starts along the vertical axis at the surface and bends at subsurface interfaces according to Snell's law. If time migration has been done correctly, the results after image ray tracing will coincide with that of more sophisticated depth migration. The aspects of seismic depth conversion have been discussed extensively in geophysical literature (Hubral, 1977; Parkes and Hatton, 1987; Black and Brzostowski, 1994; Bube et al., 2004; Kane et al., 2004). The method of choice depends on the geological complexity of the subsurface. The methodology described herein is meant for geological settings of moderate complexity. This means that the simplest vertical stretch might cause bias, but ray-tracing supposedly is sufficiently realistic.

Suppose there are two-way seismic traveltime picks, denoted $t_{k,l}$, $k=1, \ldots, n_h$, $l=1, \ldots, m$, where m is the number of picked reflecting interfaces and $n_h$ the number of traveltime picks in each horizon. The case with different number of picks in various layers is possible, but requires some technical details. Fixed surface locations $(N_{k,0}, E_{k,0}, D_{k,0})$, $k=1, \ldots, n_h$, are given as the common depth point locations (inlines/crosslines) used in time processing of seismic data. (The typical case is $D_{k,0}=0$.) Interval velocities are $v_1, \ldots, v_m$. Positions $(N_{k,l}, E_{k,l}, D_{k,l})$ are geometric reflection points for the respective traveltime picks $t_{k,l}$. For the topmost geological interface, rays are vertical and reflection positions are represented by $$N_{k,1}=N_{k,0}$$

$$E_{k,1}=E_{k,0}, k=1,\ldots,n_h,$$

$$D_{k,1}=D_{k,0}+\tfrac{1}{2}v_1 t_{k,1}$$

which can be written in short form as $$(N_{k,l},E_{k,l},D_{k,l})^T = f_{k,l}[V], V=v_1,\ldots,v_m \quad (1)$$

where $f_{k,1}: \mathfrak{R}^m \rightarrow \mathfrak{R}^3$, keeping the surface inline and crossline locations and the two-way seismic traveltimes fixed. Arranging all points in the top horizon together gives a vector:

$$h_1=(N_{1,1},E_{1,1},D_{1,1},\ldots,N_{n_h,l},E_{n_h,l},D_{n_h,l})^T.$$

For the deeper layers $l=2, \ldots, m$, the reflection positions are computed using Snell's law at interfaces. If the incidence angle with an interface is $\theta_l$ and the velocities in the upper and lower layers are given by $v_l$ and $v_{l+1}$, respectively, the transmission angle with this interface is $$\theta_l = \arcsin\left(\frac{v_{l+1}}{v_l}\sin(\theta_l)\right).$$

The reflection points in the lower layer can then be calculated by a nonlinear function of the velocities and the points in the above layers (giving the incidence angle). Geometric positions are in this way calculated recursively, going deeper at each step. The mathematical relationship can be written in short form as:

$$h_{l+1}=(N_{k,l+1},E_{k,l+1},D_{k,l+1})^T = f_{k,l}[V,(N_{k,j},E_{k,j},D_{k,j}), 1 \le j \le l, 1 \le k \le n_h], l+1 \le m \quad (2)$$

The details of this raytracing formulation are postponed to the Appendix. For the understanding of the method, it is important to note that the variables of interest include 1) Layer velocities: $V=(v_1, \ldots, v_m)$,
2) Positions (north, east and depth) for all horizons: $H=(h_1, \ldots, h_m)$.

These two types of variables will be used for well updating below.

Seismic Uncertainty Propagation

In this section the method used for calculating the uncertainty in depth converted lateral and depth positions is described. The calculation is an elementary exercise in mean and covariance calculation under a linearized model. Suppose generally that $y=f(x)$ for some function $f(\cdot)$. In our case this function $f(\cdot)$ is built up of sequential ray tracing defined by equation (2). Suppose further that $\Sigma$ is the covariance matrix of x. The covariance matrix $\Psi$ of y can be approximated by Taylor-expansion and equals $\Psi=F\Sigma F^T$, where $$F = \frac{df(x)}{dx}$$

is evaluated at the mean value of x. Following this scheme, the expressions in the Equations (1) and (2) can be differentiated to give $$F_{k,l} = \frac{\partial f_{k,l}[v_1,\ldots,v_L,(N_{k,j},E_{k,j},D_{k,j}), 1 \le j \le l, 1 \le k \le n_g]}{\partial [v_1,\ldots,v_L,(N_{k,j},E_{k,j},D_{k,j}), 1 \le j \le l, 1 \le k \le n_g]} = \frac{\partial f_{k,l}[v, h_j, 1 \le j \le l]}{\partial [v, h_j, 1 \le j \le l]} \quad (3)$$

$$= \left(\frac{\partial f_{k,l}[V, h_j, 1 \le j \le l]}{\partial V}, \frac{\partial f_{k,l}[V, h_j, 1 \le j \le l]}{\partial h_1^T}, \ldots, \frac{\partial f_{k,l}[V, h_j, 1 \le j \le l]}{\partial h_l^T}\right).$$

Here, many elements will be zero because the predicted geometric positions depend only on a few variables. All columns in Equation (3) are collected as a matrix denoted by $F_l$. Note that this matrix contains all partial derivatives when predicting positions in layer l from the above layers and the velocity values. This matrix is used to construct the covariance matrix $\Psi$ of the geometric positions in layer l obtained by ray tracing. The uncertainties in velocities are specified initially and the covariance is built sequentially, layer by layer. For the first layer:

$$\Psi_{h,1} = \begin{bmatrix} \Sigma_V & \Sigma_V \cdot F_1^T \\ F_1 \cdot \Sigma_V & F_1 \cdot \Sigma_V \cdot F_1^T + \Sigma_{\varepsilon,1} \end{bmatrix},$$

where $\Sigma_V$ is the specified covariance for velocities, while $\Sigma_{\varepsilon,1}$ is the covariance matrix for traveltime picks in layer 1. The traveltime picks are assumed to be spatially correlated according to their distance on the surface and this is represented by a spatial correlation function and a Kronecker product for $\Sigma_{\varepsilon,1}$. The deeper layers are constructed recursively by $$\Psi_{h,j+1} = \begin{bmatrix} \Psi_{h,l} & \Psi_{h,l} F_l^T \\ F_l \Psi_{h,l} & F_l \Psi_{h,l} F_l^T + \Sigma_{\varepsilon,l+1} \end{bmatrix}, l = 1, \ldots, m-1. \quad (4)$$

At l+1=m is the entire covariance matrix for all layer velocities and geometric positions in the model (north, east and depth).

Modelling of Faults

In this section we present the approach for integrating faults is now presented. The assessment of fault positions in depth coordinates and their position uncertainties can be done in several ways depending on the geological setting. The approach focuses on 'normal' faults, i.e. faults that dip in the direction of the horizon. For such faults it is assumed that the points that 'fill' holes in the horizons are merged into the horizons and positioned using ray tracing. These fault positions are referred to as 'merged' points. The remaining fault points are referred to as 'non-merged' points. The non-merged points are positioned based on the depth of merged points and on surface (inline/crossline) positions relative to the merged points in the seismic traveltime data. Fault position uncertainties are mainly assessed from the seismic error propagation, but uncertainty is also added based on the interpreter's prior judgements.

The mathematical approach used for assessing the non-merged points is now described, assuming that the position of merged points is reliably obtained from ray tracing.

Based on the set of 'merged' points, the center point ($N_c$, $E_c$, $D_c$), the dip and the azimuth of the fault are calculated. This is obtained by simply calculating the mean of all merged points and the principal components of the merged points. The calculation for principal components goes as follows: Let $\Psi_f$ denote the covariance matrix of the 'merged' fault points, in North, East and Depth coordinates. This subset of points is defined by picking the points that are merged fault points among all points. This matrix is a sub-matrix with indexes picked from $\Psi_m$ in equation (4). The principal, components defined by $\Pi$ with associated singular values $\Lambda$ are such that:

$$\Psi = \Pi \Lambda \Pi^T \quad (5)$$

From the principal components we can calculate the dip azimuth and dip inclination of the 'merged' fault points. Moreover, the center point and principal components along with the surface reference positions in the time interpretation to assign geometric coordinates to the 'non-merged' fault points are used. The 'non-merged' points ($N_f$, $E_f$, $D_f$) are given by a functional relationship which in short form is:

$$(N_f, E_f, D_f) = f_f(\Pi, (N_c, E_c, D_c)) \quad (6)$$

where the surface reference locations $N_c$, $E_c$, $D_c$ in the interpreted seismic traveltime data are treated as fixed. The function $f_f$ is in this case an inverse of the calculation of the principal components from the 'merged' points.

After the assessment of these fault points, the geological positions can be represented, by G=(H,F), where H are the original horizon points without the removed merged fault points, and where F are the fault points, both merged and non-merged. In addition, an associated covariance matrix for all positions is provided. The covariance matrix for H is set from the ray tracing error propagation, while the covariance matrix for F is set using Monte Carlo simulations for this small set of fault points based on the Equations (5) and (6). For the fault points, it is assumed that the traveltime picking is quite unreliable and the lateral entries are assigned a large uncertainty to account for this picking uncertainty of faults. No cross-correlation between horizon points H and fault points F is assumed.

Model Adjustment Based on Well Position Markers

After the faults and horizons have been converted from the time domain into depth using seismic velocities, additional measurements of their positions are being introduced to the system from borehole measurements. These additional point based measurements effectively reduce the uncertainty of the entire model clue to their low uncertainty compared to the initial depth converted model. The constraining of the model on borehole measurements is made using a least squares adjustment approach based on conditional equations. All measurement errors and thus all linear combinations of these are assumed to be Gaussian. The method is described in detail in 0. Derived from this method are the equations:

$$\hat{L} = (1 - \Sigma_{l_0 l_n} B^T (B \Sigma_{l_0 l_n} B^T)^{-1} B) L_0$$

and $$\Sigma_{\hat{L}\hat{L}} = \Sigma_{l_0 l_n} - \Sigma_{l_0 l_n} B^T (B \Sigma_{l_0 l_n} B^T)^{-1} B \Sigma_{l_0 l_n},$$

where
$L_0$ is the initial measurement vector
$\Sigma_{l_0 l_n}$ is the covariance matrix of the initial measurement vector
B is the matrix of constraining equations
$\hat{L}$ is the estimated measurement vector (constrained using the B matrix)
$\Sigma_{\hat{L}\hat{L}}$ is the covariance matrix of the estimated measurement vector, $\hat{L}$ Every stochastic variable involved, and hence any linear combination of these, is assumed to be normally distributed. The vector L consists of three types of measurements:
  interval velocities, contained in the vector V
  point positions making up the geological surfaces, contained in the vector G
  well marker positions used to constrain the geological surfaces, contained in W Each modelled position (both well markers and the geological points) consists of coordinate triplets $P = [N \ E \ D]^T$. Combining the three types of measurements into the common measurement vector L, gives:

$$L = [V G W]^T = [v_1 \ldots v_M N_{GH} E_{GH} D_{GH} \ldots N_{GSn} E_{GSn} D_{GSn} N_{W1} E_{W1} D_{W1} \ldots N_{WT} E_{WT} D_{WT}]^T$$

where M is the number of velocities (and horizons) modelled, S is the total number of geological surfaces (horizons and faults), n is the number of geological points in each surface, and T is the total number of well markers. The total number of geological points is denoted by the letter O.

Each row of the B-matrix consists of the coefficients of one constraining equation, put on the set of measurements given by $L_0$. The full constraining equations are formulated by:

$$B \cdot L = \overline{0}.$$

The rotation matrix, $$R = [R_U \ R_V \ R_W] = \begin{bmatrix} r_{11} & r_{12} & r_{13} \\ r_{21} & r_{22} & r_{23} \\ r_{21} & r_{32} & r_{33} \end{bmatrix},$$

plays an important in role in the following sections. This matrix describes the transformation between two rotated coordinate systems with the same origin. A point $P_{UVW}=[u\ v\ m]$ described in the UVW-coordinate system is thus converted to the point $P_{XYZ}=[x\ y\ z]$ in the XYZ-coordinate system through the multiplication:

$$P_{XYZ}=R_{UVW\rightarrow XYZ}\cdot P_{UVW},$$

and inversely a point in the XYZ-coordinate system is transformed into the UVW-system through:

$$P_{UVW}=R_{UVW\rightarrow XYZ}^{T}\cdot P_{XYZ}$$

Looking at the individual column vectors of $R_{UVW\rightarrow XYZ}=[R_U R_V R_W]$, they represent the unit vectors of the UVW-axes seen in the XYZ-coordinate system. Due to this last property, the column vectors of a rotation matrix are useful for specifying constraining equations in arbitrary spatial directions.

Well Adjustment Constrained in Vertical Direction

In this case, the constraints set between the D coordinates of well markers and their respective geological common-points are only specified in the vertical direction. For each pair of points a constraining equation can be formulated by:

$$CE(P_{Gk})-CE(P_{Wl})=0,$$

where $C=[0\ 0\ 1]$, $P_{Gk}$ are the coordinates of the k-th geological point in G, and $P_{Wl}$ the coordinates of the l-th well marker in the well marker vector W.

Putting these conditions into the B-matrix gives:

$$B_1 = \begin{bmatrix} 0_{1\times M} & 0_{1\times 3} & \cdots & C_1{}_{1\times 3} & \cdots & 0_{1\times 3} & 0_{1\times 3} & \cdots & -C_1{}_{1\times 3} & \cdots & 0_{1\times 3} \\ \vdots & \vdots & & \vdots & & \vdots & \vdots & & \vdots & & \vdots \\ 0_{1\times M} & 0_{1\times 3} & \cdots & C_T{}_{1\times 3} & \cdots & 0_{1\times 3} & 0_{1\times 3} & \cdots & -C_T{}_{1\times 3} & \cdots & 0_{1\times 3} \end{bmatrix}_{T\times(M+3\cdot O+3\cdot T)}$$

Each row of the $B_1$ matrix corresponds to the measurement vector $L=[V\ G\ W]^T$. Since no constraints are specified for the interval velocities in V, the M first numbers of each row vector in $B_1$ are set to 0. The next $3\cdot O$ row posts correspond to the geological points in G, O being the number of geological points in G. The three row posts matching to the geological point, $P_{Gk}$, in G are set to the vector $C_k$; the rest of the posts matching to G are set to 0. The last $3\cdot T$ posts of each row in $B_1$ correspond to the well markers in W, where T is the number of well markers included. Of these, only the three posts matching to the well marker $P_{Wl}$ are filled in with the vector-$C_l$, whereas the rest of the posts are set to 0. The total number of rows in $B_1$ equals the number of constraints T.

Well Adjustment Constrained Along Surface Normal

To set a constraint perpendicular to the geological surface in the vicinity of a certain geological common-point, the eigenvector of the n closest points to the common-point are used, specified through the rotation matrix R:

$$R = [R_U\ R_V\ R_W] = \begin{bmatrix} r_{11} & r_{12} & r_{13} \\ r_{21} & r_{22} & r_{23} \\ r_{21} & r_{32} & r_{33} \end{bmatrix} =$$

$$eig\left(\begin{bmatrix} N_1-\overline{N} & \cdots & N_n-\overline{N} \\ E_1-\overline{E} & \cdots & E_n-\overline{E} \\ D_1-\overline{D} & \cdots & D_n-\overline{D} \end{bmatrix} \cdot \begin{bmatrix} N_1-\overline{N} & \cdots & N_n-\overline{N} \\ E_1-\overline{E} & \cdots & E_n-\overline{E} \\ D_1-\overline{D} & \cdots & D_n-\overline{D} \end{bmatrix}^T\right)$$

In the following it is assumed that the eigenvectors are sorted in such a way that $R_W$ is the eigenvector corresponding to the smallest belonging eigenvalue. $R_W$ is an approximate unit vector perpendicular to the geological surface. Thus multiplying $R_W^T$ with an arbitrary vector gives the component of the arbitrary vector in the direction of $R_W$.

Using this, a condition is formulated between a pair of common-points as:

$$R_W^T(E(P_{Gk})-E(P_{Wl}))=0,$$

where $P_{Gk}$ are the coordinates of the k-th geological point in G, and $P_{Wl}$ the coordinates of the l-th well marker in the well marker vector W.

Combining several conditions into a common matrix, $B_1$, gives $$B_1 = \begin{bmatrix} 0_{1\times M} & 0_{1\times 3} & \cdots & R_{W1}^T{}_{1\times 3} & \cdots & 0_{1\times 3} & 0_{1\times 3} & \cdots & -R_{W1}^T{}_{1\times 3} & \cdots & 0_{1\times 3} \\ \vdots & \vdots & & \vdots & & \vdots & \vdots & & \vdots & & \vdots \\ 0_{1\times M} & 0_{1\times 3} & \cdots & R_{WT}^T{}_{1\times 3} & \cdots & 0_{1\times 3} & 0_{1\times 3} & \cdots & -R_{WT}^T{}_{1\times 3} & \cdots & 0_{1\times 3} \end{bmatrix}_{T\times(M+3\cdot O+3\cdot T)},$$

which correspond to the measurement vector $L=[V\ G\ W]^T$. The M first numbers of each row vector in $B_1$ are set to 0, followed on each row the $3\cdot O$ numbers corresponding to the geological points in G, M being the number of interval velocities in V and O being the number of geological points in G. The three row posts matching to the geological point, $P_{Gk}$, in G are set to the vector $R_{Wk}^T$; the rest of the posts matching to G are set to 0. The last $3\cdot T$ posts of each row in $B_1$ correspond to the well markers in W, where T is the number of well markers included. Of these, only the three posts matching to the well marker $P_{Wl}$ are filled in with the vector-$R_{Wl}$, whereas the rest of the posts are set to 0. Specifying one constraint for each well marker included, the total number of rows in $B_1$ is equal to T.

Well Adjustment Constrained in Image Ray Direction

In this case, the constraints between the coordinates of the common points (i.e. well markers and geological points) are set in the direction of the incident angle of the ray trace. This constraint can be expressed by:

$$E(r^T[X_w-X_g\ Y_w-Y_g\ Z_w-Z_g]^T)=E(r_1(X_w-X_g)+r_2(Y_w-Y_g)+r_3(Z_w-Z_g))=0$$

where $r=[r_1\ r_2\ r_3]^T$ is the unit vector of the incident ray on the surface, $(XYZ)_w$ and $(XYZ)_g$ are the coordinates of the well markers and geological points respectively.

The above mentioned constraint can be expressed by the following matrix:

$$B_1 = \begin{bmatrix} 0_{1\times M} & 0_{1\times 3} & \cdots & r_{Tk}^T{}_{1\times 3} & \cdots & 0_{1\times 3} & 0_{1\times 3} & \cdots & -r_{T1}^T{}_{1\times 3} & \cdots & 0_{1\times 3} \\ \vdots & \vdots & & \vdots & & \vdots & \vdots & & \vdots & & \vdots \\ 0_{1\times M} & 0_{1\times 3} & \cdots & r_{Tk}^T{}_{1\times 3} & \cdots & 0_{1\times 3} & 0_{1\times 3} & \cdots & -r_{T1}^T{}_{1\times 3} & \cdots & 0_{1\times 3} \end{bmatrix}_{T\times(M+3\cdot O+3\cdot T)}$$

where the indexes k and l correspond respectively to the points $P_{Gk}$ and $P_{Wl}$ of the L vector. T is the number of common point pairs.

Constraints Between Faults and Horizons

Constraints between faults and horizons can be added to make horizon and fault crossings fit together also after update. For a single pair of points consisting of a horizon point and a fault point, such a condition is stated as:

$$IE(P_{Hk})-IE(P_{Fl})=0,$$

stating that the horizon point $P_{Hk}$ on the border between a horizon and a fault shall be identical to the corresponding fault point $P_{Fl}$.

Similar fault-fault intersection constraints can be stated as:

$$IE(P_{Fk})-IE(P_{Fl})=0$$

Sets of such constraints can be added to the B-matrix forming the constraining equation set:

$$B \cdot L = \begin{bmatrix} B_1 \\ B_2 \end{bmatrix} \cdot L = \overline{0}$$

where $$B_2 = \begin{bmatrix} 0_{3 \times M} & 0_{3 \times 3} & \cdots & I_1 \phantom{0}_{3 \times 3} & \cdots & 0_{3 \times 3} & 0_{3 \times 3} & -I_1 \phantom{0}_{3 \times 3} & \cdots & 0_{3 \times 3T} \\ \vdots & \vdots & & \vdots & & \vdots & \vdots & \vdots & & \vdots \\ 0_{3 \times M} & 0_{3 \times 3} & \cdots & I_S \phantom{0}_{3 \times 3} & \cdots & 0_{3 \times 3} & 0_{3 \times 3} & -I_S \phantom{0}_{3 \times 3} & \cdots & 0_{3 \times 3T} \end{bmatrix}_{3T \times (M+3 \cdot O+3 \cdot T)}$$

Each row of the $B_2$ matrix corresponds to the measurement vector $L=[V\ G\ W]^T$.

The first M posts of each row as well as the last $3 \cdot T$ are set to 0, since interval velocities and well markers are not included in these constraints. M is the number of interval velocities, and T is the number of well markers. For each horizon and fault point pair, there are three constraining equations; their coefficients are represented by two 3×3 unit matrices in $B_2$. Making the total number of rows in $B_2$, $3 \cdot S$. S is the number of horizon/fault point pairs.

Picking of Common Points

As mentioned earlier, the least squares adjustment is based on setting constraints between wellmarkers and geological points. The wellmarker and the geological point constitute a common point. For a given wellmarker, the method for choosing the best suited geological point may depend on the applied constraining principle.

In this section, four methods for picking of common points will be presented. Three of these methods are especially suited for the constraining principles disclosed hereinbefore. The fourth method may be applicable for all constraining principles.

1.1.1 Constraint in Vertical Directions

When constraints between well marker and geological points are to be set in the vertical direction, the geology point with the closest lateral Euclidian distance to the well marker is used as common point. The lateral distance $d_h$ is calculated by:

$$d_h = \sqrt{(N_W - N_G)^2 + (E_W - E_G)^2}$$

where $N_W$ and $N_G$ denote the north coordinates of the wellmarker and the geological point respectively.

1.1.2 Constraints Along Surface Normal

As geological common point in this case, the geological point that lies closest to the approximate geological surface normal through the well marker is used. To calculate this distance, we need to transform both geology points and well marker into a coordinate system in which one of the axes lies along the surface normal. This is done using the eigenvectors of the n closest geology points to the surface as rotation matrix, to transform between the NED-coordinate system and the UVW system, in which the W direction lies along the surface normal. The rotation matrix is calculated as follows:

$$R_{UVW \to NKD} = [R_U\ R_V\ R_W] =$$

$$eig\left( \begin{bmatrix} N_1 - \overline{N} & \cdots & N_n - \overline{N} \\ E_1 - \overline{E} & \cdots & E_n - \overline{E} \\ D_1 - \overline{D} & \cdots & D_n - \overline{D} \end{bmatrix} \cdot \begin{bmatrix} N_1 - \overline{N} & \cdots & N_n - \overline{N} \\ E_1 - \overline{E} & \cdots & E_n - \overline{E} \\ D_1 - \overline{D} & \cdots & D_n - \overline{D} \end{bmatrix}^T \right),$$

Where $$R_{NED \to UVW} = R_{UVW \to NED}^T$$

It is assumed that the column vectors of $R_{NED \to UVW}$, are sorted in such a way that the $R_W$ vector is the eigenvector corresponding to the smallest eigenvalue. In the transformations the midpoint $\overline{P}_G$ of the n closest geology points to the well marker, $P_W$, is used as origin for the UVW-coordinate system.

Thus the transformations of arbitrary $P_G$ and $P_W$ points into the UVW system are formulated as:

$$P_{G,UVW} = \begin{bmatrix} U_G \\ V_G \\ W_G \end{bmatrix} = R_{NED \to UVW}(P_{G,NEV} - \overline{P}_G)$$

and $$P_{W,UVW} = \begin{bmatrix} U_W \\ V_W \\ W_W \end{bmatrix} = R_{NED \to UVW}(P_{W,NEV} - \overline{P}_G)$$

The perpendicular distance $d_{UV}$ between the surface normal through the well marker and the various geological points is then calculated by the formula:

$$d_{UV} = \sqrt{(U_W - U_G)^2 + (V_W - V_G)^2}$$

1.1.3 Constraints in Image Ray Direction

A suitable geological point can be found by comparing the perpendicular distances between the actual wellpick and all the nearby incident ray traces of the geological points. The geological point corresponding to the perpendicularly closest ray trace will then be the candidate for common point.

The following approach can be used to find the shortest perpendicular distance between a wellpick and the nearby incident ray traces. First, a subset of the closest geological points to the wellmarker is found by comparing horizontal coordinates. Then, we have to calculate the shortest perpendicular distance from the wellpick to every unit ray-trace vector.

Let the wellmarker and the geological point be denoted by:

$$P_W = [X_W\ Y_W\ Z_W]\ \text{and}\ P_G = [X_G\ Y_G\ Z_G]$$

The vector $\tilde{w}$ from the wellmarker $P_W$ to the geological point $P_G$ is given by:

$$\tilde{w} = [X_W - X_G\ Y_W - Y_G\ Z_W - Z_G]$$

The perpendicular distance D from the wellmarker to the unit vector $\tilde{u}$ of the incident ray trace is simply the length of the cross product of $\tilde{w}$ and $\tilde{u}$. This length can be calculated by:

$$D = |\tilde{w} \times \tilde{u}| = ([\tilde{w} \times \tilde{u}][\tilde{w} \times \tilde{u}]^T)^{1/2}$$

The above-mentioned procedure has to be repeated for all the wellmarkers in the actual area.

1.1.4 "Most Likely" Geological Common Point

This method uses the uncertainty ellipsoids of the well marker and geological points to decide the "most likely" geological common point. A weighted distance measure is calculated by:

$$d_{weighted} = \sqrt{(P_W - P_G) \cdot \text{inv}(\Sigma_W + \Sigma_G) \cdot (P_W - P_G)^T}$$

The summation of the covariance matrix $\Sigma_W$ of the well marker and the covariance matrix $\Sigma_G$ of the geological point is possible since the original seismic interpretation is assumed to be uncorrelated with the well marker.

Well Marker Uncertainty Model

The coordinates of the wellmarkers are important input. Another important input is the variances of the coordinates of the wellmarkers and the covariances between them. A wellbore consists of several survey points and some of these survey points are chosen as wellmarkers.

The coordinates of wellmarkers are calculated from directional surveys and measured depths performed at several stations along the wellbore. The directional surveys are correlated between survey stations. This is also the case for the measured depths. These correlations should be taken into account to ensure a proper variance and covariance matrix propagation.

Modelling of Variances and Covariances of Wellmarkers

Depth measurements are a significant contributor to the wellbore position uncertainty when surveying both with magnetic and gyroscopic instruments. Correlations between depth measurements are considered to be the most important correlation in wellbore surveying. Another source to strong correlations is the declination error.

A detailed overview of the most important error sources in depth measurements is given in Ekseth, R 1998. The following procedure is found appropriate to investigate of the effects of depth correlations.

For prediction of the correlation behaviour of depth measurements between survey points along the wellbore, a correlation function may be used. A correlation function can for instance be expressed in terms of an exponential function:

$$\rho = e^{D_i - D_j/\xi}$$

where $\rho_{ij}$ is the correlation coefficient, $\xi$ is the a suitable correlation length, and $D_i$ and $D_j$ are the measured depth in unit meters at the points i and j respectively. The correlation length $\xi$ is defined as the length needed for the correlation between two wellmarkers to fall below a certain value.

The covariance $\sigma_{ij}^2$ between the wellmarkers i and j can be predicted by the following formula:

$$\sigma_{ij}^2 = \rho_{ij}\sqrt{\sigma_{ii}^2 \sigma_{jj}^2}$$

where $\rho_{ij}$ is the correlation coefficient, and $\sigma_{ii}$ and $\sigma_{jj}$ are the variances of the wellmarkers number i and number j, respectively.

REFERENCES

Abrahamsen, P., 1992, Bayesian Kriging for seismic depth conversion of a multi-layer reservoir, In Proc. From $4^{th}$ geostatistical conference, Troia 1992.

Abrahamsen, P. and Benth, F. E., 2001, Kriging with inequality constraints, Mathematical Geology (33), 719-744.

Black, J. L. and Brzostowski, M. A., 1994, Systematics of time-migration errors. Geophysics (59), 1419-1434.

Bube, K. P., Kane, J. A., Nemeth, T., Medwedeff, D., and Mikhailov, O., 2004, The influence of stacking velocities uncertainties on structural uncertainties, Society of Exploration geophysicists, Expanded Abstracts (23), 2188-2191.

Caumon, G., Lepage, F., Sword, C. H., and Mallet, J, L., 2004, Building and editing a sealed geological model, Mathematical Geology (36), 719-744.

Cressie, N. O. C., 1993, Statistics for spatial data, Wiley.

Haarstad, I., Lotsberg, O., Torkildsen, T., and Munkerud, P. K., 2002, Target design based upon multidisciplinary uncertainty information, Society of Petroleum Engineers, SPE 74460.

Holden, L., Mostad, P., Nielsen, B. F., Gjerde, J., Townsend, C., and Ottesen, S., 2003, Stochastic Structural Modeling, Mathematical Geology (35), 899-913.

Hubral, P.: Time migration—some ray theoretical aspects, Geophysical Prospecting (25), 738-745.

Kane, J. A., Rodi, W., Bube, K. P., Nemeth, T., Medwedeff, D., and Mikhailov, O., 2004, Structural uncertainty and Bayesian inversion, Society of Exploration geophysicists, Expanded Abstracts (23), 1511-1514.

Parkes, G. and Hatton, L., 1987, Towards a systematic understanding of the effects of velocity model errors on depth and time migration of seismic data, First Break (5), 121-132.

Prange, M, D., Tilke, P. G., and Kaufman, P. S., 2004, Assessing borehole-position uncertainty from real-time measurements in an Earth, Society of Petroleum Engineers, SPE 89781.

Thore, P., Shtuka, A., Lecour, M., Ait-Ettajer, T., and Cognot. R., 2002, Structural uncertainties: Determination, management and applications, Geophysics (67), 840-852.

Ekseth, R 1998. Uncertainties in Connection with the Determination of wellbore positions, 1998. Doctoral thesis 1998, Norwegian University of Science and Technology. ISBN Torkildsen T., 2006, Method of combining spatial models, U.S. Pat. No. 7,149,672 B2 Aikhalifa T., Larner K., 1994, Migration error in transversely isotropic media, Geophysics (59), 1405-1418

Image Ray Tracing

Image raytracing is defined by starting a ray vertically at the surface and applying Snell's law at interfaces. At every interface of two horizons l and l+1, and for every point $k = 1, \ldots, n_h$ the following is needed for raytracing:

1) The unit vector of the incidence ray:

$$u_{k,l} = \frac{(N_{k,l} - N_{k,l-1}, E_{k,l} - E_{k,l-1}, D_{k,l} - D_{k,l-1})}{\sqrt{(N_{k,l} - N_{k,l-1})^2 + (E_{k,l} - E_{k,l-1})^2 + (D_{k,l} - D_{k,l-1})^2}}, \quad (A1)$$

2) The unit normal vector at point k of interface l:

$$u_{k,n} = \frac{(-\alpha_x, -\alpha_y, 1)}{\sqrt{\alpha_x^2 + \alpha_y^2 + 1}}, \quad (A2)$$

where $$\alpha_x = \frac{\sum_{j \in \partial k} (D_{j,l} - \overline{D})(N_{j,l} - \overline{N})}{\sum_{j \in \partial k} (N_{j,l} - \overline{N})^2} \quad (A3)$$

$$\alpha_y = \frac{\sum_{j \in \partial k} (D_{j,l} - \overline{D})(E_{j,l} - \overline{E})}{\sum_{j \in \partial k} (E_{j,l} - \overline{E})^2}$$

$$\overline{N} = \sum_{j \in \partial k} N_{j,l}, \overline{E} = \sum_{j \in \partial k} E_{j,l}, \overline{D} = \sum_{j \in \partial k} D_{j,l}.$$

and $\partial k$ is a specified neighborhood of point k.

3) The incidence angle at point k of layer l:

$$\theta_{k,l} = \arccos(u_{k,n} u_{k,l}^T) \quad (A4)$$

where $$u_{k,n} u_{k,l}^T = u_{k,n}(1) \cdot u_{k,l}(1) + u_{k,n}(2) \cdot u_{k,l}(2) + u_{k,n}(3) \cdot u_{k,j}(3) \quad (A5)$$

4) The transmission angle at point k into layer l+1 calculated using Snell's law:

$$\theta_{k,l} = \arcsin\left[\frac{\sin(\theta_{k,l})v_{l+1}}{v_l}\right], \quad (A6)$$

5) The transmission unit vector at point k into layer l+1:

$$u_{k,l} = \frac{v_{l+1}}{v_l}u_{k,l} + \left(\cos(\theta_{k,l}) - \frac{v_{l+1}}{v_l}\cos(\theta_{k,l})\right)u_{k,n}, \quad (A7)$$

where the scalar coefficients in front of $u_{k,l}$ and $u_{k,n}$ are evaluated by ensuring that $$\cos(\theta_{k,l}) = u_{k,n}u_{k,l}^T,$$

$$\|u_{k,l}\| = 1 \quad (A8)$$

is valid, that $\sin^2(\theta) = 1 - \cos^2(\theta)$ and Snell's law in Eqn. (10).

6) The predicted point k in layer l+1:

$$N_{k,l+1} = N_{k,l} + \tfrac{1}{2}v_{l+1}(t_{k,l+1} - t_{k,l})u_{k,l}(1)$$

$$E_{k,l+1} = E_{k,l} + \tfrac{1}{2}v_{l+1}(t_{k,l+1} - t_{k,l})u_{k,l}(1), \; k=1,\ldots,N,$$

$$D_{k,l+1} = N_{k,l} + \tfrac{1}{2}v_{l+1}(t_{k,l+1} - t_{k,l})u_{k,l}(1) \quad (A9)$$

where components of the transmission unit vector are given by $u_{k,l} = [u_{k,l}(1), u_{k,l}(2), u_{k,l}(3)]$. Steps 1)-6) described in Eqn. (5-13) can be written in short form as:

$$(N_{k,l+1}, E_{k,l+1}, D_{k,l+1})^T = f_{k,l}[v_1, \ldots, v_m, (x_{k,l}, y_{k,l}, z_{k,l}),$$
$$1 \le j \le l, 1 \le k \le n_h] \quad (A10)$$

where the function $f_{k,l} : \mathfrak{R}^{m+3mn_b} \to \mathfrak{R}^3$ summarizes all the relationships.

Deduction of the Least Squares Adjustment Formulas
Definitions
Measured values: $L = [l_1, l_2, l_3 \ldots]^T$
The measurement errors are considered to be normal distributed, and therefore all linear combinations of these are also normal distributed.
Measurement weights:

$$P_{LL} = \begin{bmatrix} p_1 & 0 & 0 & \ldots \\ 0 & p_2 & 0 & \ldots \\ 0 & 0 & p_3 & \ldots \\ \ldots & \ldots & \ldots & \ldots \end{bmatrix}$$

Cofactor matrix: $Q_{LL} = P_{LL}^{-1}$
If the measured values are weighted using their initial measurement uncertainties then $Q_{LL} = P_{LL}^{-1} = \Sigma_{LL}$, where $\Sigma_{LL}$ denotes the initial covariance matrix of the measured values.
Unknowns: $X = [x_1, x_2, x_3 \ldots]^T$
Residuals: $\epsilon = L - L_{true}$
Model: $AX - L_{true} = c$, which gives $\epsilon = AX - F$ where $F = L + c$. c is a constant vector. In statistical terms from [2]:

$$E[L] = AX - c; \; E\{(L - E\{L\})(L - E\{L\})^T\} = \Sigma_{LL}$$

Condition equation: $BX - W_c = 0$, where $W_c$ is a constant vector.
Error propagation law: If we have the model $y = Ax$ then $Q_{\hat{y}\hat{y}} = AQ_{\hat{x}\hat{x}}A^T$ Generating Normal Equations
Using the condition equation, we can construct the help function h, in which the weighted sum of squares is conditioned on the condition equation, using Lagrange multipliers:

$$h = \epsilon^T P_{LL}\epsilon + 2K(BX - W_c)$$

K is a vector of Lagrange multipliers. Filling in for $\epsilon$ gives:

$$h = X^T A^T P_{LL} AX - 2A^T P_{LL} FX + F^T P_{LL} F + 2K(BX - W_c)$$

Using the derivatives of the help function with respect on the unknowns K and X, we can create a set of normal equations containing the least squares estimates of K and X as unknown sizes:

$$\frac{\partial h}{\partial X} = 0 \Rightarrow A^T P_{LL} A\hat{X} - A^T P_{LL} F + B^T \hat{K} = 0$$

$$\frac{\partial h}{\partial K} = 0 \Rightarrow B\hat{X} - W_c = 0$$

Rearranging the normal equations into a matrix equation, gives a straightforward way to calculate $\hat{X}$ and $\hat{K}$:

$$\begin{bmatrix} \hat{X} \\ \hat{K} \end{bmatrix} = \begin{bmatrix} A^T P_{LL} A & B^T \\ B & 0 \end{bmatrix}^{-1} \begin{bmatrix} A^T P_{LL} F \\ W_c \end{bmatrix}$$

Using the error propagation law, the cofactor matrix for $\hat{X}$ and $\hat{K}$ becomes:

$$\begin{bmatrix} Q_{\hat{X}\hat{X}} & Q_{\hat{X}\hat{K}} \\ Q_{\hat{X}\hat{K}}^T & Q_{\hat{K}\hat{K}} \end{bmatrix} = \begin{bmatrix} A^T P_{LL} A & B^T \\ B & 0 \end{bmatrix}^{-1} \begin{bmatrix} A^T P_{LL} A & 0 \\ 0 & 0 \end{bmatrix} \begin{bmatrix} A^T P_{LL} A & B^T \\ B & 0 \end{bmatrix}^{-1}.$$

Direct Calculation of the Estimate for X
As it is only $\hat{X}$ and $Q_{\hat{X}\hat{X}}$ we are interested in, it opens for direct calculation of these. Starting with:

$$A^T P_{LL} A\hat{X} - A^T P_{LL} F + B^T \hat{K} = 0,$$

we substitute $A^T(P_{LL})A$ with $N_0$, and rearrange equation to:

$$\hat{X} = N_0^{-1} A^T P_{LL} F - N_0^{-1} B^T \hat{K}$$

Substituting for $\hat{X}$ in:

$$B\hat{X} - W_c = 0,$$

gives:

$$\hat{K} = (BN_0^{-1}B^T)^{-1} BN_0^{-1} A^T P_{LL} F - (BN_0^{-1}B^T)^{-1} W_c,$$

Substituting this result into the equation for $\hat{X}$, gives:

$$\hat{X} = N_0^{-1} A^T P_{LL} F - N_0^{-1} B^T (BN_0^{-1}B^T)^{-1} BN_0^{-1} A^T P_{LL} F + N_0^{-1} B^T (BN_0^{-1}B^T)^{-1} W_c$$

Direct Calculation of the Estimate for $Q_{XX}$
Applying the error propagation law on:

$$\hat{X} = N_0^{-1} A^T P_{LL} F - N_0^{-1} B^T (BN_0^{-1}B^T)^{-1} BN_0^{-1} A^T P_{LL} F + N_0^{-1} B^T (BN_0^{-1}B^T)^{-1} W_c,$$

gives:

$$Q_{\hat{X}\hat{X}} = N_0^{-1} - N_0^{-1} B^T (BN_0^{-1}B^T)^{-1} BN_0^{-1}.$$

The Statistical Model: $X - L = 0$.
Looking at the statistical model: $AX - L = c$, which gives $\epsilon = AX - F$ where $F = L + c$. c is a constant vector. It can be easily transformed into the model $X - L = 0$, by setting $A = 1$, and $c = 0$, which leads to $F=L$, and $N_0=P_{LL}$. We still want to keep the condition equation: $BX-W_c=0$.

Applying these changes to:

$$\hat{X}=N_0^{-1}A^T P_{LL}F - N_0^{-1}B^T(BN_0^{-1}B^T)^{-1}BN_0^{-1}A^T P_{LL}F + N_0^{-1}B^T(BN_0^{-1}B^T)^{-1}W_c$$

gives:

$$\hat{X}=L-P_{LL}^{-1}B^T(BP_{LL}^{-1}B^T)^{-1}BL + P_{LL}^{-1}B^T(BP_{LL}^{-1}B^T)^{-1}W_c.$$

And applying them to:

$$Q_{\hat{X}\hat{X}}=N_0^{-1}-N_0^{-1}B^T(BN_0^{-1}B^T)^{-1}BN_0^{-1},$$

gives:

$$Q_{\hat{X}\hat{X}}=P_{LL}^{-1}-P_{LL}^{-1}B^T(BP_{LL}^{-1}B^T)^{-1}BP_{LL}^{-1}.$$

The invention claimed is:

1. A method of forming a geological model of a region of the Earth, comprising:
   "i." receiving seismic data relating to the region, the seismic data including seismic travel time uncertainty;
   "ii." providing a seismic velocity model of the region including velocity uncertainty;
   "iii." determining three-dimensional positions of a plurality of points of the region;
   "iv." calculating three-dimensional positional uncertainties of at least some of the plurality of points from the seismic travel time uncertainty and the velocity uncertainty; and
   "v." combining the positions determined in the step "iii" with the uncertainties calculated in the step "iv" to form a first geological model.

2. The method of claim 1, wherein at least some of the points are disposed at an interface, identified from the seismic data, between sub-regions of the region of different seismic velocities.

3. The method of claim 1, wherein at least some of the points are disposed at faults identified from the seismic data.

4. The method of claim 1, wherein the travel time uncertainty is determined from a seismic wavelength used to obtain the seismic data.

5. The method of claim 1, wherein the step "v" includes assigning correlations among at least some of the points.

6. The method of claim 1, further comprising assigning correlations among velocity values in the velocity model.

7. The method of claim 1, further comprising:
   "vi." providing non-seismically obtained three-dimensional position data and three-dimensional positional uncertainty data about the region; and
   "vii" adjusting the first geological model by means of the data provided in step "vi" to obtain a second geological model.

8. The method of claim 7, wherein the non-seismically obtained data comprises well marker data.

9. The method of claim 7, wherein the step "vii" comprises selecting at least one common point of the region which is common to the first geological model and to the non-seismically obtained data and determining the position and the positional uncertainty of the common point in the second geological model from the positions and the positional uncertainties of the common point in the first geological model and in the non-seismically obtained data.

10. The method of claim 9, wherein the at least one common point represents common or adjacent geological features.

11. The method of claim 10, wherein the non-seismically obtained data comprise well marker data and the at least one common point represents a location on one interface in the first geological model and a location in the non-seismically obtained data where a well passes through the interface.

12. The method of claim 10, wherein the at least one common point represents a location of a fault in the first geological model and a location in the non-seismically obtained data where a well passes through the fault.

13. The method of claim 12, wherein the step "vii" comprises moving the location of the common point in the first geological model substantially perpendicularly to the fault surface.

14. The method of claim 13, further comprising updating the non-seismically obtained data by moving the location of the common point in the non-seismically obtained data in a direction substantially opposite a direction of movement in the first geological model.

15. The method of claim 7, wherein the step "vi" comprises providing non-seismically obtained velocity data and velocity uncertainty data about the region.

16. The method of claim 5 further comprising forming and/or updating the velocity model in accordance with the non-seismically obtained velocity and velocity uncertainty data.

17. The method of claim 7, where the step "vii" is performed with a constraint that interface/fault intersections are preserved in the second geological model.

18. The method of claim 9 wherein the step "vii" comprises selecting a plurality of common points and adjusting the first geological model in a single step.

19. The method of claim 7, wherein the step "vii" comprises adjusting the first geological model recursively layer by layer.

20. A computer program embodied on a non-transitory computer-readable medium for controlling a computer to perform a method of forming a geological model of a region of the Earth, the method comprising:
   "i." analyzing seismic data relating to the region, the seismic data including seismic travel time uncertainty;
   "ii." providing a seismic velocity model of the region including velocity uncertainty;
   "iii." determining three-dimensional positions of a plurality of points of the region;
   "iv." calculating three-dimensional positional uncertainties of at least some of the plurality of points from the seismic travel time uncertainty and the velocity uncertainty; and
   "v." combining the positions determined in the step "iii" with the uncertainties calculated in the step "iv" to form a first geological model.

21. A system for forming a geological model of a region of the Earth, the system comprising:
   a computer including ax least one data processor;
   a non-transitory computer-readable medium programmed with instructions to control the computer to:
      "i." analyze seismic data relating to the region, the seismic data including seismic travel time uncertainty;
      "ii." provide a seismic velocity model of the region including velocity uncertainty;
      "iii." determine three-dimensional positions of a plurality of points of the region;
      "iv." calculate three-dimensional positional uncertainties of at least some of the plurality of points from the seismic travel time uncertainty and the velocity uncertainty; and "v." combine the positions determined in the step "iii" with the uncertainties calculated in the step "iv" to form a first geological model.

22. A non-transitory computer-readable storage medium comprising instructions for performing a method on a computer of forming a geological model of a region of the Earth, the method comprising:
"i." analyzing seismic data relating to the region, the seismic data including seismic travel time uncertainty;
"ii." providing a seismic velocity model of the region including velocity uncertainty;
"iii." determining three-dimensional positions of a plurality of points of the region;
"iv." calculating three-dimensional positional uncertainties of at least some of the plurality of points from the seismic travel time uncertainty and the velocity uncertainty; and
"v." combining the positions determined in the step "iii" with the uncertainties calculated in the step "iv" to form a first geological model.

23. A method of drilling a bore in a region of the earth, comprising performing a method of forming a geological model of a region of the Earth, the method comprising:
"i." providing seismic data relating to the region, the seismic data including seismic travel time uncertainty;
"ii." providing seismic velocity model of the region including velocity uncertainty;
"iii." determining three-dimensional positions of a plurality of points of the region;
"iv." calculating three-dimensional positional uncertainties of at least some of the plurality of points from the seismic travel time uncertainty and the velocity uncertainty; and
"v." combining the positions determined in the step "iii" with the uncertainties calculated in the step "iv" to form a first geological model; and
"vi." controlling drilling in accordance with the geological model.

* * * * *